US010594233B2

(12) United States Patent
Annaka et al.

(10) Patent No.: US 10,594,233 B2
(45) Date of Patent: Mar. 17, 2020

(54) BRUSHLESS MOTOR, WIPER APPARATUS, MOTOR APPARATUS AND CONTROL METHOD FOR MOTOR APPARATUS

(71) Applicant: Mitsuba Corporation, Kiryu-shi, Gunma (JP)

(72) Inventors: Tomohiko Annaka, Kiryu (JP); Hiroto Tanaka, Kiryu (JP); Naoki Kojima, Kiryu (JP); Toru Furusawa, Kiryu (JP); Tomofumi Kobayashi, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 15/958,095

(22) Filed: Apr. 20, 2018

(65) Prior Publication Data
US 2018/0323733 A1 Nov. 8, 2018

Related U.S. Application Data

(62) Division of application No. 15/107,658, filed as application No. PCT/JP2014/083821 on Dec. 22, 2014, now abandoned.

(30) Foreign Application Priority Data

Dec. 25, 2013 (JP) .................... 2013-267084
Dec. 25, 2013 (JP) .................... 2013-267085

(51) Int. Cl.
*H02P 7/06* (2006.01)
*H02P 6/10* (2006.01)
(Continued)

(52) U.S. Cl.
CPC .............. *H02P 6/10* (2013.01); *B60S 1/08* (2013.01); *B60S 1/166* (2013.01); *H02P 27/08* (2013.01)

(58) Field of Classification Search
CPC .. B60S 1/08; B60S 1/166; H02P 27/08; H02P 6/10
See application file for complete search history.

(56) References Cited

U.S. PATENT DOCUMENTS 6,002,250 A 12/1999 Masreliez et al.
6,111,378 A 8/2000 LeMay et al.
(Continued)

FOREIGN PATENT DOCUMENTS

CN 1614252 A 5/2005
CN 1832306 A 9/2006
(Continued)

OTHER PUBLICATIONS

International Search Report for Serial No. PCT/JP2014/084220 dated Mar. 4, 2015.
(Continued)

*Primary Examiner* — Muhammad S Islam
(74) *Attorney, Agent, or Firm* — McCormick, Paulding & Huber PLLC

(57) ABSTRACT

A brushless motor (18) which supplies currents to coils (U1, U2, V1, V2, W1, and W2) and rotates a rotor (27), the brushless motor comprising a control apparatus (37) which switches and selectively executes: first energization control to start energization to the coils (U1, U2, V1, V2, W1, and W2) at first timing, and to continue the energization for a first period to control the rotation number of the rotor (27); and second energization control to start energization to the coils (U1, U2, V1, V2, W1, and W2) at second timing advanced by an electric angle with respect to the first timing, and to continue the energization for a second period longer than the first period to control the rotation number of the rotor (27).

6 Claims, 23 Drawing Sheets

(51) Int. Cl.
  *B60S 1/08* (2006.01)
  *B60S 1/16* (2006.01)
  *H02P 27/08* (2006.01)

(56) References Cited

U.S. PATENT DOCUMENTS

| | | | |
|---|---|---|---|
| 6,307,341 | B1 | 10/2001 | Chun |
| 7,294,986 | B2 | 11/2007 | Marentette |
| 8,800,097 | B2 | 8/2014 | Wegner et al. |
| 9,056,595 | B2 | 6/2015 | Wegner et al. |
| 2004/0007998 | A1 | 1/2004 | Yasohara et al. |
| 2005/0097698 | A1 | 5/2005 | Yagi et al. |
| 2006/0071621 | A1* | 4/2006 | Sugiura ............... H02P 6/10 318/400.24 |
| 2007/0069595 | A1 | 3/2007 | Hiramatsu et al. |
| 2007/0164621 | A1* | 7/2007 | Kano ............... H02K 5/225 310/71 |
| 2010/0037416 | A1 | 2/2010 | Amagasa et al. |
| 2010/0054971 | A1 | 3/2010 | Li et al. |
| 2011/0012461 | A1* | 1/2011 | Tomigashi ............ H02K 1/276 310/156.01 |
| 2013/0113400 | A1 | 5/2013 | Kishimoto et al. |
| 2013/0180545 | A1* | 7/2013 | Nelson ............... B60S 1/08 134/6 |
| 2013/0255408 | A1 | 10/2013 | Tokizaki et al. |
| 2015/0082575 | A1* | 3/2015 | Kimura ............... B60S 1/166 15/250.12 |

FOREIGN PATENT DOCUMENTS

| | | |
|---|---|---|
| CN | 103249607 A | 8/2013 |
| DE | 10011842 A1 | 10/2001 |
| DE | 10153173 A1 | 10/2002 |
| DE | 102006060621 A1 | 6/2008 |
| DE | 102007059905 A1 | 6/2009 |
| DE | 102011077191 A1 | 12/2012 |
| EP | 1318930 B1 | 11/2004 |
| EP | 2354550 A2 | 10/2010 |
| EP | 2256016 A1 | 12/2010 |
| JP | 01-142357 U1 | 9/1989 |
| JP | 2003047277 A | 2/2003 |
| JP | 2004274993 A | 9/2004 |
| JP | 2005086855 A | 3/2005 |
| JP | 2005155903 A | 6/2005 |
| JP | 2005168133 A | 6/2005 |
| JP | 2006197762 A | 7/2006 |
| JP | 2006254534 A | 9/2006 |
| JP | 2006353026 A | 12/2006 |
| JP | 2007060775 A | 3/2007 |
| JP | 2007097352 A | 4/2007 |
| JP | 2007143278 A | 6/2007 |
| JP | 2007202391 A | 8/2007 |
| JP | 2008103618 A | 5/2008 |
| JP | 2009010082 A | 1/2009 |
| JP | 2009190587 A | 8/2009 |
| JP | 2010093977 A | 4/2010 |
| JP | 2010288383 A | 12/2010 |
| JP | 2011506169 A | 3/2011 |
| JP | 2012210068 A | 10/2012 |
| JP | 2012249470 A | 12/2012 |
| JP | 2013-198188 | 9/2013 |
| WO | 0222409 A1 | 3/2002 |
| WO | 2006034508 A1 | 3/2006 |
| WO | 2009074384 A1 | 6/2009 |
| WO | 2010034410 A1 | 4/2010 |
| WO | 2013157558 A1 | 10/2013 |

OTHER PUBLICATIONS

International Search Report for Serial No. PCT/JP2014/084224 dated Mar. 19, 2015.
International Search Report for Serial No. PCT/JP2014/083821 dated Mar. 16, 2015.
Supplementary European Search Report for Serial No. EP 14 87 4948 dated Sep. 12, 2017.
Supplementary European Search Report for Serial No. EP 14 87 5320 dated Jul. 14, 2017.
European Search Report for Serial No. 14 874 948.4 dated Aug. 21, 2018.

* cited by examiner

BRUSHLESS MOTOR, WIPER APPARATUS, MOTOR APPARATUS AND CONTROL METHOD FOR MOTOR APPARATUS

CROSS REFERENCE TO RELATED APPLICATION

This application is a divisional of U.S. patent application Ser. No. 15/107,658 filed on Jun. 23, 2016 and published as U.S. Patent Application Publication No. 2016/0322921, which is the National Stage filing of PCT Application No. PCT/JP2014/083821 filed on Dec. 22, 2014, which claims priority to Japanese Patent Application No. 2013-267084 filed on Dec. 25, 2013 and Japanese Patent Application No. 2013-267085 filed Dec. 25, 2013, the contents of each are incorporated by reference herein in their entirety.

TECHNICAL FIELD

The present invention relates to a brushless motor and a wiper apparatus, each of which has a stator and a rotor, and can control the rotation number of the rotor.

The present invention relates to a motor apparatus having a sensor for sensing a phase in rotation direction of a rotor, and a control method for the motor apparatus.

BACKGROUND ART

Examples of conventional electric motors are described in Japanese Patent Application Laid-Open Publication No. 2007-202391; Japanese Patent Application Laid-Open Publication No. 2007-143278; and Japanese Patent Application Laid-Open Publication No. 2010-93977. The electric motor described in each of Japanese Patent Application Laid-Open Publication No. 2007-202391 and Japanese Patent Application Laid-Open Publication No. 2007-143278 is an electric motor with brush, provided with: a magnet (stator) serving as a field fixed to a case; and a rotor serving as an armature rotatably provided in the case. Furthermore, the electric rotor is provided with: a core around which coils is wound; and a commutator connected to the coil. In addition, the electric rotor is further provided with: a common brush which contacts the commutator; a low-speed-driving brush; and a high-speed-driving brush.

The brushes are disposed in the phases mutually different in the rotation direction of the electric rotor, and switching elements are provided at the respective paths which supply electric power to the brushes. When the switching elements are turned on or off, the brush to supply a current is switched, and the rotation number of the electric rotor is controlled to a low speed or a high speed.

The motor described in Japanese Patent Application Laid-Open Publication No. 2010-93977 is not provided with a brush, but is provided with a stator (stationary part), which is serving as an armature in a case, and a rotor serving as a field rotatably provided in the case. The stator has a stator core and a coil wound around the stator core. The coil has three coils to which excitation currents of three phases, in other words, a U-phase, a V-phase, and a W-phase are supplied, and the coils are disposed so that the phases are mutually shifted in the rotation direction of the rotor.

Furthermore, it is provided with switching elements electrically connected to the respective coils. By alternately switching on/off of the switching elements and controlling duty ratios, which are the rate of "on", currents are supplied to all the coils with shifted timing, and the rotation number of the rotor is controlled.

On the other hand, one example of a conventional motor apparatus is described in Japanese Patent Application Laid-Open Publication No. 2003-47277. The motor apparatus described in Japanese Patent Application Laid-Open Publication No. 2003-47277 is provided with a brushless motor, an inverter circuit, a control circuit, a speed control arithmetic unit, etc. The brushless motor has: a rotor to which permanent magnets and a sensor magnet are attached; and a stator provided in the outer peripheral side of the rotor. The stator ha: a core which is a stack of steel plates or the like; and three coils corresponding to three phases, in other words, a U-phase, a V-phase, and a W-phase wound around the core.

Furthermore, the inverter circuit is used for connecting/shutting-off the three coils and an electric power source, and it is provided with positive-electrode switching elements and negative-electrode switching elements corresponding to the U-phase, the V-phase and the W-phase. Furthermore, the control circuit separately turns on/off the switching elements.

Furthermore, based on the intensity of the magnetic field formed by the sensor magnet, three sensors which output signals are provided to correspond to the U-phase, the V-phase, and the W-phase. The three sensors are disposed at an interval of a mechanical angle 120° outside the sensor magnet. Furthermore, the signals output from the sensors are input to the speed control arithmetic unit, and the speed control arithmetic unit controls on/off of the switching elements of the inverter circuit.

In the motor apparatus described in Japanese Patent Application Laid-Open Publication No. 2003-47277, on/off of the switching elements is controlled, currents are supplied to the three coils at predetermined timing, and a rotating magnetic field is formed by the three coils to rotate the rotor. Furthermore, the speed control arithmetic unit detects the rotation phases of the rotor on the basis of the signal output from the singe sensor determined in advance among the three sensors and, on the basis of the detected rotation phase, controls the on/off timing of the switching elements.

Therefore, even if there are errors in the attachment positions of the other two sensors with respect to the single sensor determined in advance, it is assumed that electric power can be distributed to the three coils at ideal energization timing, and the rotation number of the rotor can be appropriately controlled.

SUMMARY

The electric motors as described in Japanese Patent Application Laid-Open Publication No. 2007-202391; Japanese Patent Application Laid-Open Publication No. 2007-143278; and Japanese Patent Application Laid-Open Publication No. 2010-93977 have problems that, regardless of whether the electric motor is provided with brushes or not, torque ripples at the rotor are increased depending on control conditions.

An object of the present invention is to provide a brushless motor and a wiper apparatus capable of suppressing the torque ripples at the rotor.

In the brushless motor described in the Japanese Patent Application Laid-Open Publication No. 2003-47277, since it is difficult to say that the signals of the three sensors are effectively utilized, it is possible to further improve the brushless motor and the wiper apparatus.

It is therefore an object of the present invention to provide a motor apparatus and a motor control method capable of effectively utilizing signals of sensors for detecting rotation phases of a rotor.

According to one aspect of the present invention, there is provided a brushless motor which supplies a current to a coil and rotates a rotor, the brushless motor comprising a control unit which switches and selectively executes: first energization control to start energization to the coil at first timing, and to continue the energization for a first period to control the rotation number of the rotor; and second energization control to start energization to the coil at second timing advanced by an electric angle with respect to the first timing, and to continue the energization for a second period longer than the first period to control the rotation number of the rotor.

In the brushless motor of the present invention, the second timing is advanced by an electric angle 30° with respect to the first timing.

In the brushless motor of the present invention, the first period is an electric angle 120°, and the second period is equal to or more than an electric angle 135° and equal to or less than an electric angle 165°.

In the brushless motor of the present invention, the rotor has: a rotor shaft having a rotor core attached to an outer peripheral surface thereof; and four permanent magnets disposed on the outer peripheral surface of the rotor core along a circumferential direction of the rotor shaft, wherein a stator having the coil is provided outside the rotor; and the coil is provided with 6 slots at intervals in the circumferential direction of the rotor shaft.

A wiper apparatus of the present invention comprises: the above described brushless motor; and a wiper arm which receives power from the rotor of the brushless motor, and which is moved so as to wipe off a window glass of a vehicle.

The wiper apparatus of the present invention comprises: a mode switching unit which switches and selects one of a low-speed mode to move the wiper arm at a speed determined in advance; and a high-speed mode to move the wiper arm at a speed faster than the low-speed mode, wherein the control unit executes the second energization control when the high-speed mode is selected.

A motor apparatus of the present invention is a motor apparatus which supplies currents to a plurality of coils and rotates a rotor, the motor apparatus comprising: a plurality of switching elements which separately turn on or off current supply paths connected to the coils; a plurality of sensors which are different in phase from each other, provided in a rotation direction of the rotor, and detects a phase of the rotor in the rotation direction to generate output signals; a signal correcting unit which uses an output signal of any one sensor among the sensors as a reference signal, and corrects the output signal of the other sensor; and an element control unit which separately turns on or off the switching elements on the basis of the reference signal and the corrected output signal.

In the motor apparatus according to the present invention, the element control unit switches and selectively executes: first energization control to start energization to the coils at first timing to control an output of the rotor; and second energization control to start energization to the coils at second timing advanced by a predetermined electric angle with respect to the first timing to control the output of the rotor.

In the motor apparatus according to the present invention, the element control unit executes third energization control to continue energization to the coil for the time longer than the time in which the energization to the coil is continued in the second energization control.

The motor apparatus according to the present invention is provided with a control board to which the switching elements, the sensors, the signal correcting unit, and the element control unit are attached.

In the motor apparatus according to the present invention, the rotor has: a rotor shaft having a rotor core attached to an outer peripheral surface thereof; and has four permanent magnets disposed on the outer peripheral surface of the rotor core along a circumferential direction of the rotor shaft, wherein a stator having the coils is provided outside the rotor; and the coils are provided with six slots at intervals in the circumferential direction of the rotor shaft.

The motor apparatus according to the present invention is provided with a power transmitting mechanism that transmits torque of the rotor to a wiper arm which wipes off a window glass of a vehicle.

A control method for the above-described motor apparatus for controlling an output of a rotor comprises: a first step of controlling the output of the rotor by using an output signal of any one sensor among the sensors as a reference signal, and correcting the output signal of the other sensor; and a second step of separately turning on or off the switching elements on the basis of the reference signal and the corrected output signal.

According to the brushless motor and the wiper apparatus of the present invention, it is possible to suppress torque ripples of the rotor.

According to the motor apparatus and the control method for the motor apparatus of the present invention, on the basis of the signal of one of the sensors, the signal of the other sensor is corrected, and the rotation phases of the rotor are detected by the sensors. Therefore, it is possible to effectively utilize the signals of the sensors.

DETAILED DESCRIPTION

Hereinafter, embodiments of the present invention will be described in detail with reference to the accompanying drawings.

First Embodiment

Figure 1:
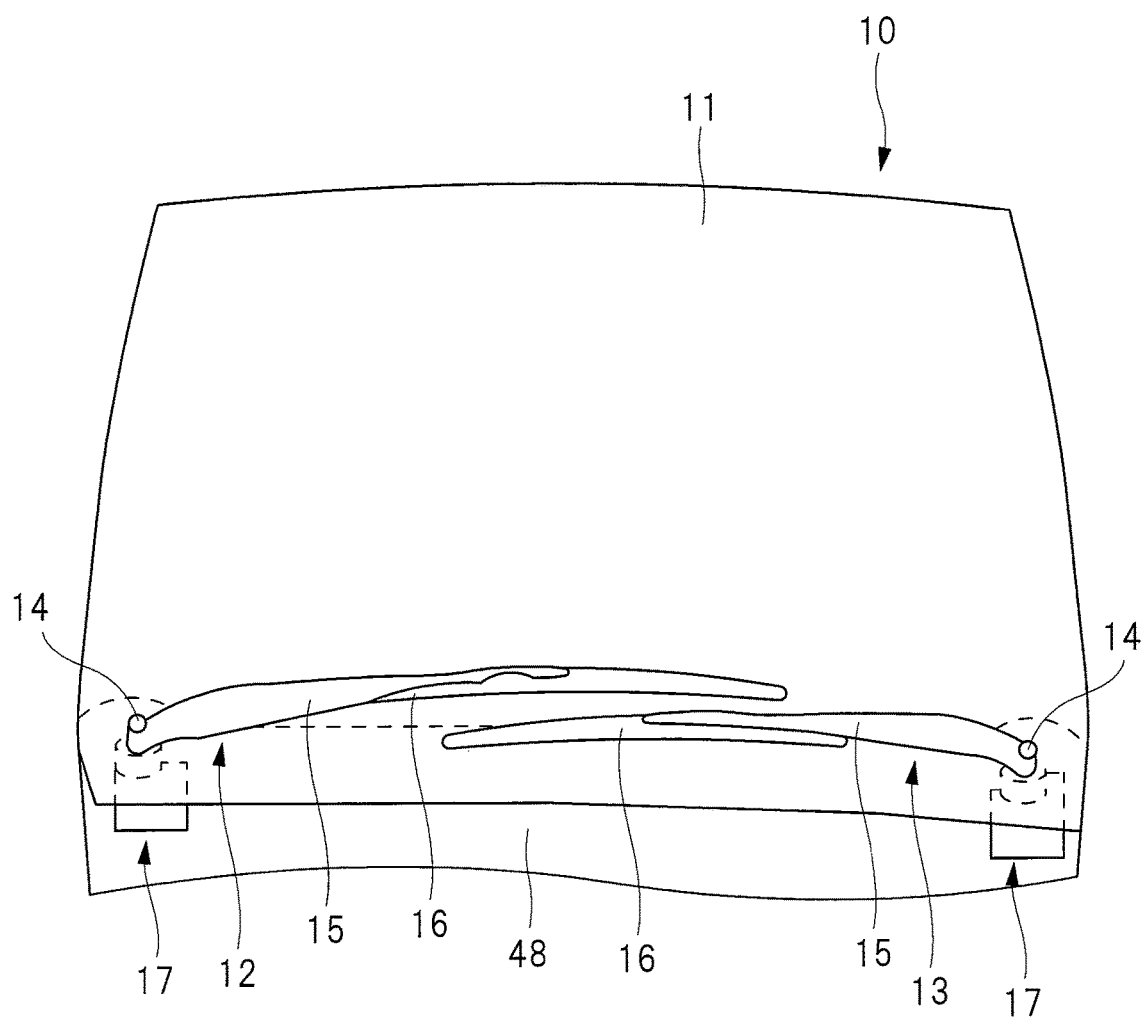
FIG. 1 is a schematic view showing an example in which a brushless motor of the present invention is applied to a wiper apparatus of a vehicle.

A vehicle 10 shown in FIG. 1 has a windshield 11. Furthermore, the vehicle 10 has a first wiper apparatus 12 and a second wiper apparatus 13, which wipe off the windshield 11. The first wiper apparatus 12 and the second wiper apparatus 13 are disposed at positions different from each other in the width direction of the vehicle 10. Since the first wiper apparatus 12 and the second wiper apparatus 13 have approximately left-right symmetric structures, hereinafter, the first wiper apparatus 12 will be described for the sake of convenience. The first wiper apparatus 12 has: a wiper arm 15 which swings about a pivot shaft 14; and a wiper blade 16 which is attached to the wiper arm 15. Furthermore, the first wiper apparatus 12 has a motor apparatus 17 serving as a drive apparatus which drives the wiper arm 15. The motor apparatus 17 is provided with: a brushless motor 18; and a speed reduction mechanism 19 which transmits the power of the brushless motor 18 to the pivot shaft 14.

Figure 2:
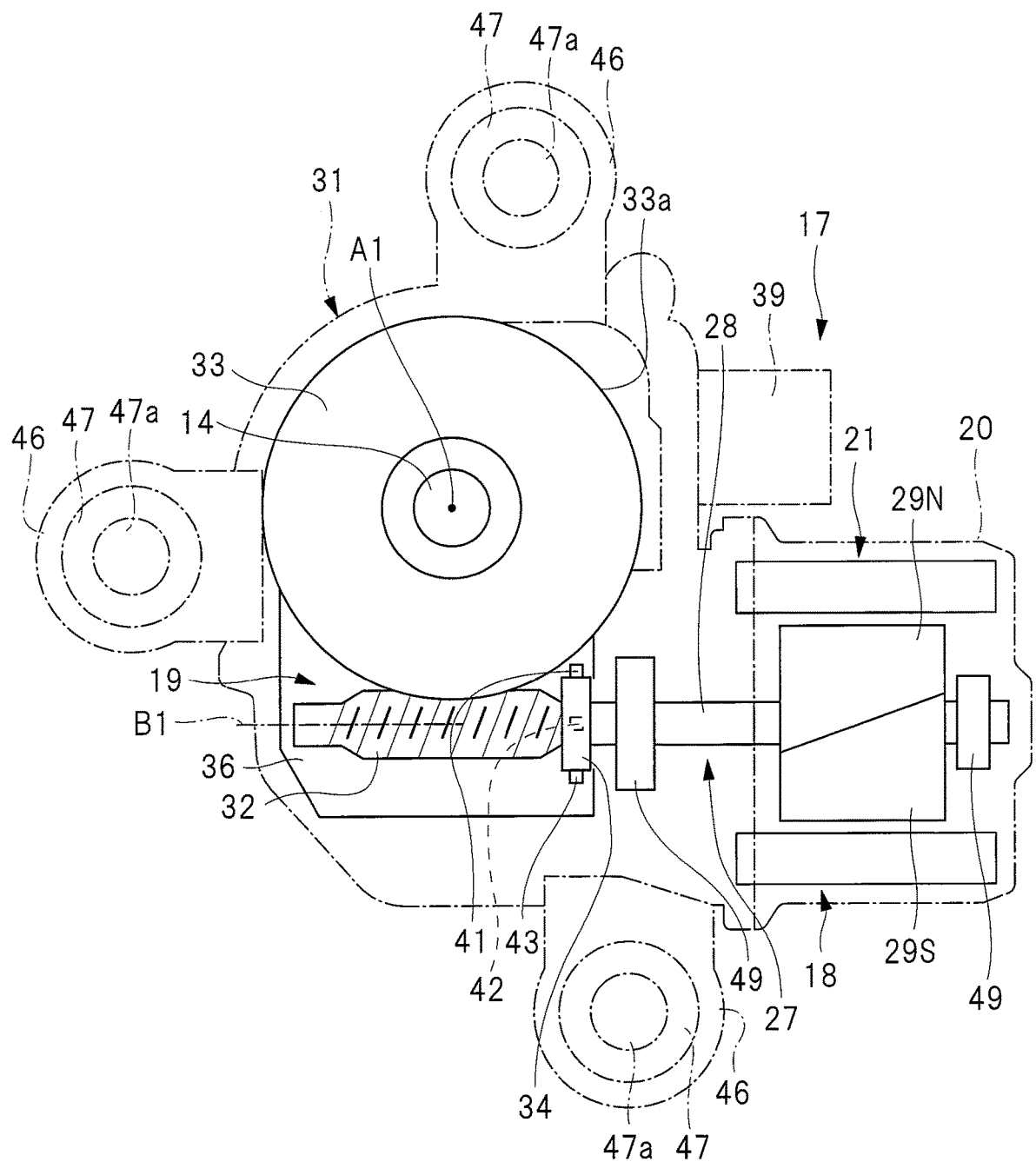
FIG. 2 is a schematic plan view showing the brushless motor of the present invention.
Figure 3:
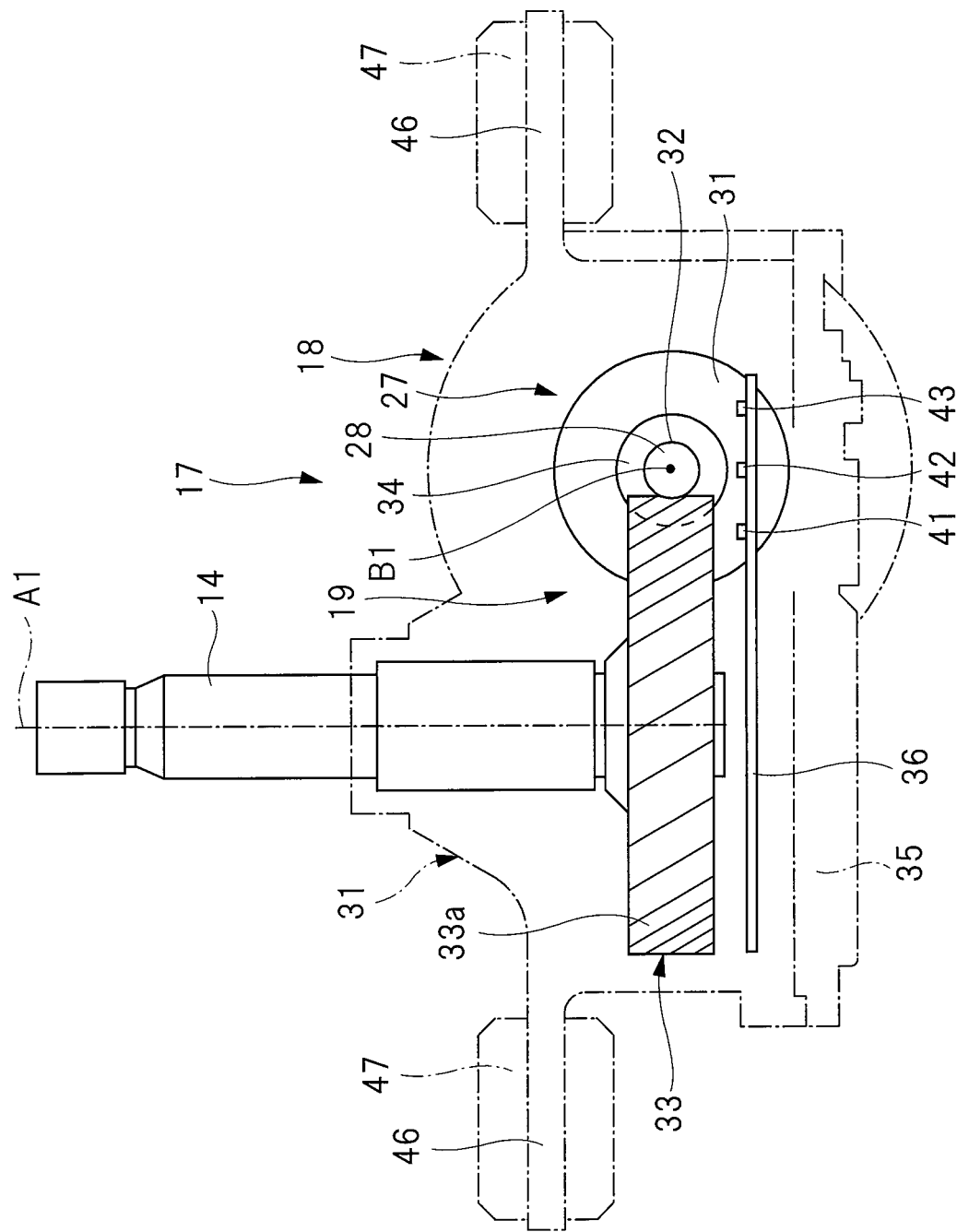
FIG. 3 is a schematic lateral view showing the brushless motor of the present invention.
Figure 4:
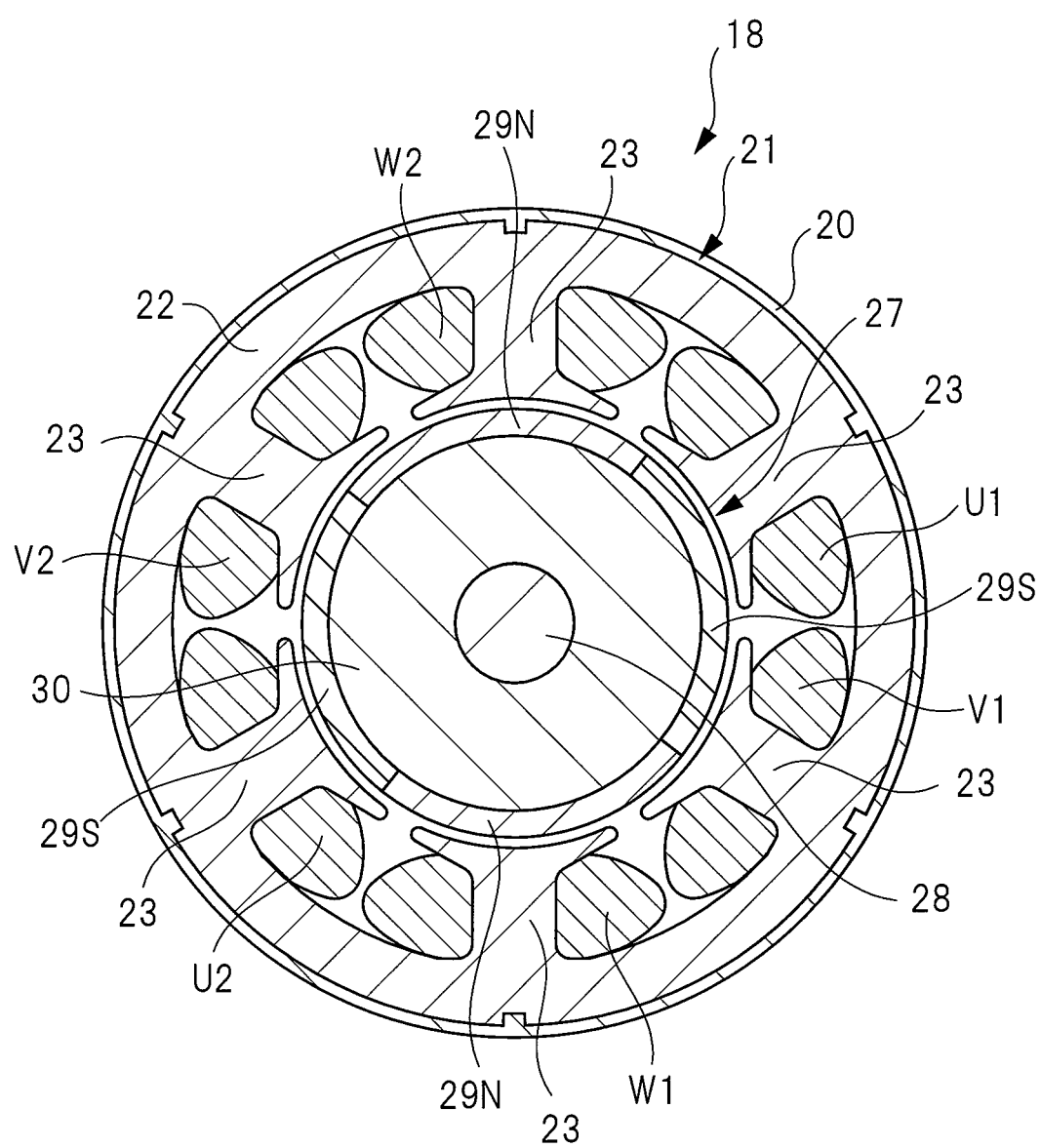
FIG. 4 is a cross sectional view of the brushless motor of the present invention.

The brushless motor 18 is formed as shown in FIGS. 2 to 4. The brushless motor 18 in this embodiment has a motor case 20 formed into a bottomed cylindrical shape, and an armature 21 serving as a stator is provided on an inner periphery of the motor case 20. The armature 21 has a stator core 22 and armature coils V1, V2, U1, U2, W1, and W2 wound around the stator core 22. The stator core 22 is stacked electrically-conductive metal plates, and, on the inner periphery of the stator core 22, a plurality of, specifically, six teeth 23 are provided at intervals in the circumferential direction. The armature coils V1, V2, U1, U2, W1, and W2 are separately wound around the six teeth 23, respectively.

The armature coils V1 and V2 correspond to V-phases, the armature coils U1 and U2 correspond to U-phases, and the armature coils W1 and W2 correspond to W-phases. In FIG. 4, clockwise with respect to the armature 21, the armature coil U1, the armature coil V1, the armature coil W1, the armature coil U2, the armature coil V2, and the armature coil W2 are provided in this order. The armature coils V1 and V2, the armature coils U1 and U2, and the armature coils W1 and W2 have mutually different phases of energization period.

Figure 5:
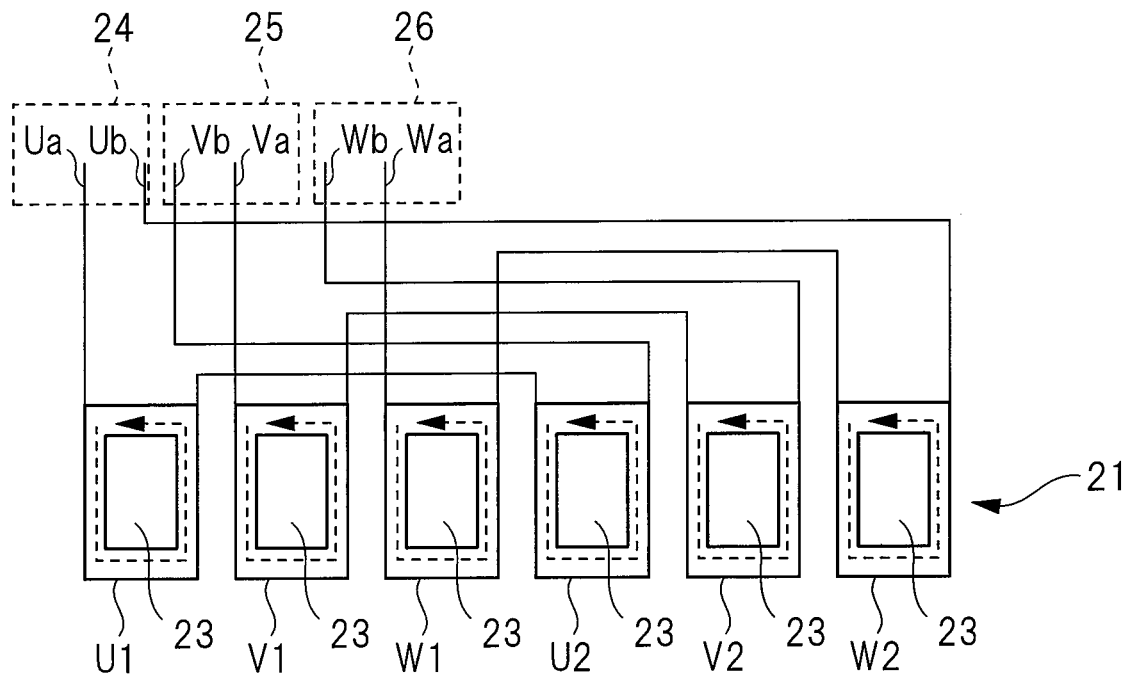
FIG. 5 is a conceptual diagram showing an armature of the brushless motor of the present invention.
Figure 6:
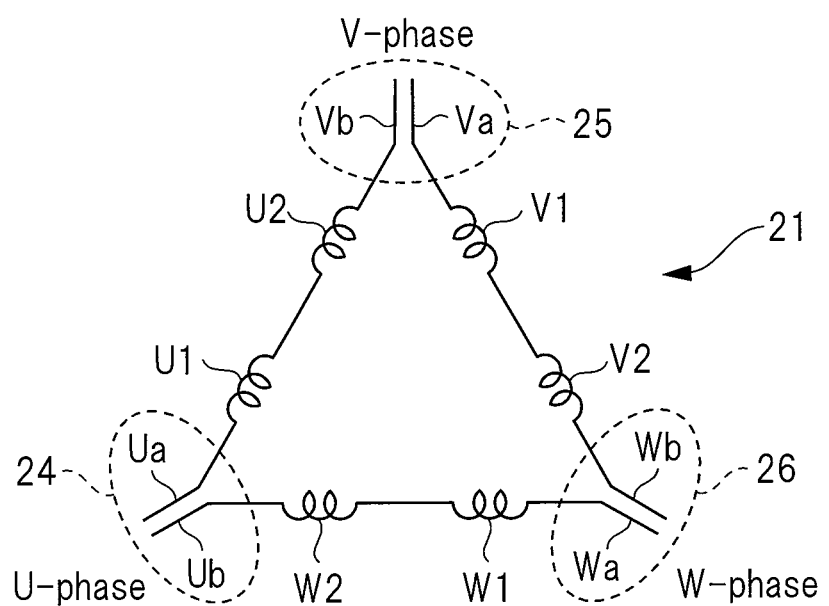
FIG. 6 is a conceptual diagram showing the armature of the brushless motor of the present invention.

Furthermore, as shown in FIGS. 5 and 6, an end "Ua" of the armature coil U1 and an end "Ub" of the armature coil W2 are connected by a terminal 24. Also, an end "Vb" of the armature coil U2 and an end "Va" of the armature coil V1 are connected by a terminal 25. Furthermore, an end "Wa" of the armature coil W1 and an end "Wb" of the armature coil V2 are connected by a terminal 26. In this manner, the brushless motor 18 employs delta connections as the connection structure of the six armature coils.

On the other hand, the brushless motor 18 has a rotor 27, and the rotor 27 is provided in the inner side of the armature 21. The brushless motor 18 has an inner-rotor-type structure in which the rotor 27 is disposed in the inner side of the armature 21, which is serving as a stator. The rotor 27 has a rotor shaft 28 and permanent magnets 29N and 29S of four polarities fixed to an outer periphery of the rotor shaft 28 via a rotor core 30. The polarity of the two permanent magnets 29N is the N pole, the polarity of the two permanent magnets 29S is the S pole, and the permanent magnets 29N and the permanent magnets 29S are alternately disposed along the circumferential direction of the rotor shaft 28. The brushless motor 18 has 4 as the number of the permanent magnets, has 6 as the number of the armature coils, and has a four-pole six-slot structure.

In this manner, the brushless motor 18 has a SPM (Surface Permanent Magnet) structure. The SPM structure is a structure in which the permanent magnets 29N and 29S are fixed to the outer peripheral surface of the rotor core 30. The rotor core 30 is formed of an iron-based magnetic material. Furthermore, the rotor shaft 28 is rotatably supported by a plurality of bearings 49.

On the other hand, the motor apparatus 17 is provided with a gear case 31 which houses the speed reduction mechanism 19, and the gear case 31 and the motor case 20 are fixed by a fastener member (not shown). Part of the rotor shaft 28 in the length direction is disposed in the motor case 20, and the remaining part thereof is disposed in the gear case 31. A worm 32 is formed on the outer periphery of the part of the rotor shaft 28 that is disposed in the gear case 31. A worm wheel 33 is provided in the gear case 31. A gear 33a is formed on the outer periphery of the worm wheel 33, and the gear 33a and the worm 32 are meshed with each other.

The pivot shaft 14 is disposed concentrically with the worm wheel 33, and the pivot shaft 14 is integrally rotated with the worm wheel 33. The worm 32 and the gear 33a are the speed reduction mechanism 19 in this embodiment. The speed reduction mechanism 19 is a mechanism which reduces the rotation number (output rotation number) of the pivot shaft 14 with respect to the rotation number (input rotation number) of the rotor 27 when the power of the rotor 27 is transmitted to the pivot shaft 14. The rotation number in this embodiment is the rotation number per unit time and synonymous with a rotation speed.

Furthermore, in FIG. 3, in an upper part of the gear case 31, a shaft hole (not shown) is provided. The end of the pivot shaft 14 that is in the opposite side of the end to which the worm wheel 33 is fixed is exposed to outside via the shaft hole of the gear case 31. The wiper arm 15 is coupled to the part of the pivot shaft 14 that is exposed to outside the gear case 31.

On the other hand, a sensor magnet 34 is attached to the part of the rotor shaft 28 that is disposed in the gear case 31. The sensor magnet 34 is integrally rotated with the rotor shaft 28. The sensor magnet 34 has a cylindrical shape, and the sensor magnet 34 is magnetized so that N poles and S poles are alternately juxtaposed along the circumferential direction of the rotor shaft 28.

An opening is provided at a part of the gear case 31 that is in the opposite side of the shaft hole thereof. This opening is formed for inserting the worm wheel 33, the pivot shaft 14, etc. into the gear case 31. An under cover 35, which closes the opening, is provided. The under cover 35 has a tray shape, and a control board 36 is provided in the space surrounded by the under cover 35 and the gear case 31.

Figure 7:
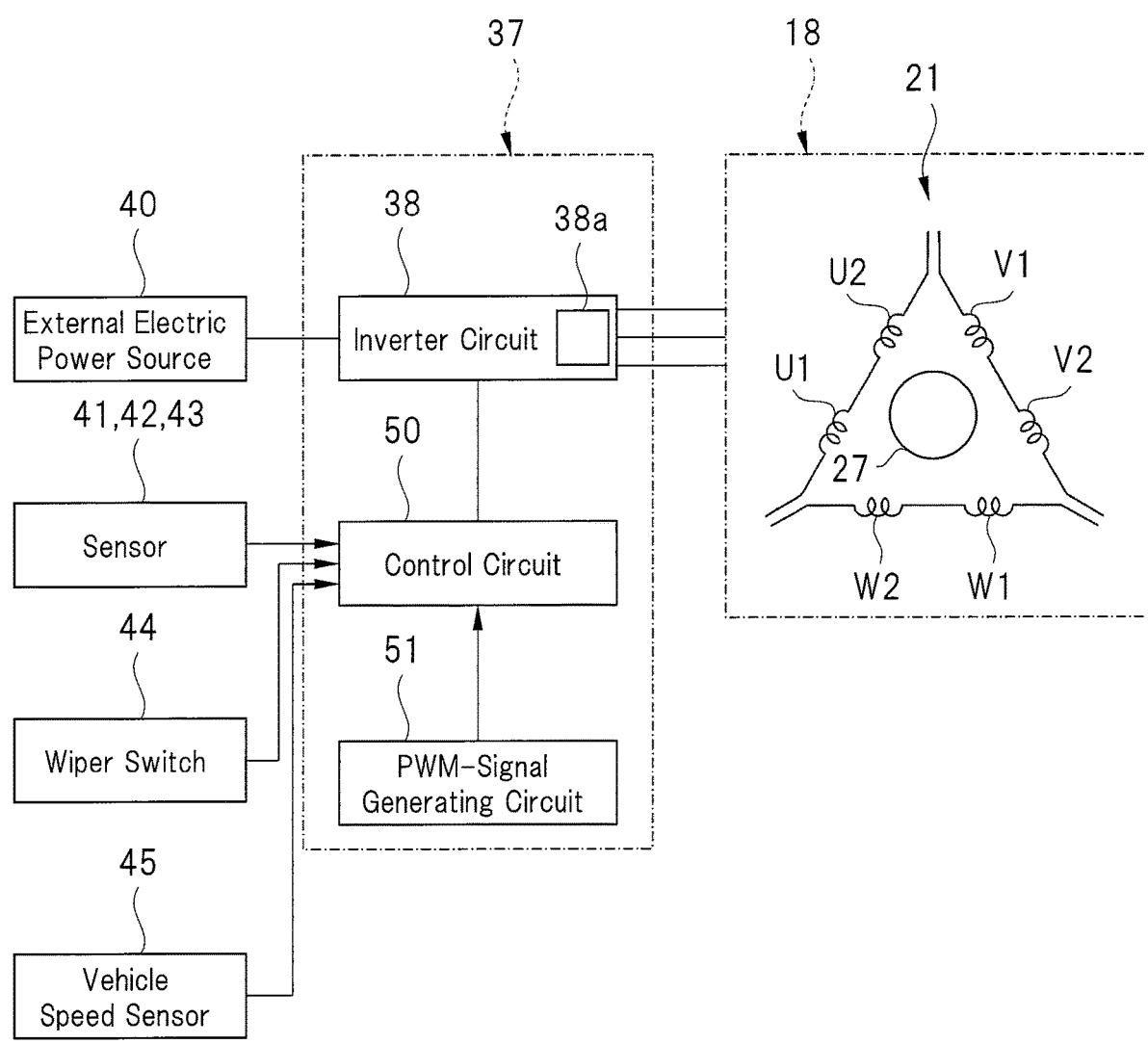
FIG. 7 is a block diagram showing a control system of the brushless motor of the present invention.

As shown in FIG. 7, a drive apparatus 37, which controls the brushless motor 18, is provided on the control board 36. The drive apparatus 37 has an inverter circuit 38, which controls energization to the six armature coils V1, V2, U1, U2, W1, and W2. The inverter circuit 38 is connected to the terminals 24, 25, and 26. Furthermore, the under cover 35 is provided with a connector 39; and, when an electric-power-source cable connected to an external electric power source 40 is connected to the connector 39, the external electric power source 40 and the inverter circuit 38 are connected to each other. The external electric power source 40 includes a battery, a capacitor, or the like mounted on the vehicle 10.

Furthermore, the inverter circuit 38 is provided with a plurality of switching elements 38a, which separately connect or shut off the external electric power source 40 and the six armature coils V1, V2, U1, U2, W1, and W2. The switching elements 38a are composed of, for example, semiconductor elements such as FETs. More specifically, the switching elements include three positive-electrode-side switching elements corresponding to the U-phase, the V-phase, and the W-phase and connected to a positive electrode of the external electric power source 40 and include three negative-electrode-side switching elements corresponding to the U-phase, the V-phase, and the W-phase and connected to the negative-electrode side of the external electric power source 40. The number of the switching elements 38a provided is six in total.

If the switching element 38a is connected (on), a current is supplied from the external electric power source 40 to the armature coil. On the other hand, if the switching element 38a is shut off (off), the current is not supplied from the external electric power source 40 to the armature coil. Furthermore, a control circuit (controller) 50, which switches on and off of the switching elements 38a, is connected to the inverter circuit 38.

The control circuit 50 is a publicly-known microcomputer provided with a CPU, a RAM, a ROM, etc. Furthermore, the drive apparatus 37 has a PWM-signal generating circuit 51, and the signals of the PWM-signal generating circuit 51 are input to the control circuit 50. The control circuit 50 outputs drive signals which control the three negative-electrode-side switching elements, and the PWM signals are superimposed on the drive signals. Therefore, the three negative-electrode-side switching elements are driven by PWM control and are intermittently turned on in respective energization periods. The values of the currents supplied to the six armature coils V1, V2, U1, U2, W1, and W2 are controlled by controlling the rates at which the three negative-electrode-side switching elements are separately turned on, in other words, duty ratios. In other words, the energization periods in which electric power is supplied to the six armature coils V1, V2, U1, U2, W1, and W2 can be increased/reduced between 0% and 100% with respect to the entire period in which electric power can be distributed. Furthermore, the control circuit 50 stores data, programs, etc. for controlling the rotation number of the rotor 27 of the brushless motor 18.

Furthermore, the brushless motor 18 in this embodiment can rotate the rotor 27 forward/backward by carrying out switching control of on and off of the switching elements 38a and inverting the directions of energization to the six armature coils V1, V2, U1, U2, W1, and W2. If the switching elements 38a are turned on, the external electric power source 40 and the armature coils V1, V2, U1, U2, W1, and W2 are separately connected; and, if the switching elements 38a are turned off, the external electric power source 40 and the armature coils V1, V2, U1, U2, W1, and W2 are separately shut off.

The control board 36 is disposed along the planar direction which is perpendicular to a first axis A1 of the pivot shaft 14. The first axis A1 serves as a center when the pivot shaft 14 rotates. Three sensors 41, 42, and 43 are attached to the control board 36. All of the three sensors 41, 42, and 43 are Hall ICs, and the three sensors 41, 42, and 43 are fixed to the control board 36 without contacting the sensor magnet 34. The three sensors 41, 42, and 43 are arranged in the direction intersecting with a second axis B1 of the rotor shaft 28 as shown in FIG. 2 by a planar view of the control board 36. The second axis B1 serves as a center when the rotor shaft 28 rotates.

The disposition range of the three sensors 41, 42, and 43 and the disposition range of the sensor magnet 34 are overlapped with each other at least partially in the direction along the second axis B1. Furthermore, if it is assumed that the control board 36 is horizontally disposed, as shown in FIG. 3, the single sensor 42 is disposed immediately below the second axis B1. The three sensors 41, 42, and 43 are disposed at equal intervals in the direction intersecting with the second axis B1. Furthermore, the sensor 42 is disposed between the sensor 41 and the sensor 43.

When the rotor 27 is rotated and moves the magnetic poles of the sensor magnet 34, the three sensors 41, 42, and 43 carry out switching operations, and the three sensors 41, 42, and 43 separately generate switching signals (on/off signals), respectively. On the basis of the switching signals of the three sensors 41, 42, and 43, the control circuit 50 can detect the rotation angle and the rotation number of the rotor 27. Furthermore, a wiper switch 44 is provided in the interior of the vehicle 10. When a driver manipulates the wiper switch 44 and selects a low-speed mode or a high-speed mode, manipulation signals of the wiper switch 44 are input to the control circuit 50. Furthermore, a vehicle-speed sensor 45, which detects the travelling speed of the vehicle 10, is provided, and detection signals of the vehicle-speed sensor 45 are input to the control circuit 50.

The control circuit 50 stores, in advance, data, arithmetic expressions, etc. that control the timing to turn on/off the switching elements 38a of the inverter circuit 38, the duration time to turn on the switching elements 38a, etc. on the basis of various conditions such as the manipulation signals of the wiper switch 44, the detection signals of the vehicle-speed sensor 45, and the actuation load of the wiper arm 15. The actuation load of the wiper arm 15 can be specifically estimated from the signals of the sensors 41, 42, and 43.

For example, it is assumed that the high-speed mode is selected, a target rotation number of the rotor 27 to achieve a target wiping speed of the wiper arm 15 is obtained, and energization control is carried out so that the actual rotation number of the rotor 27 becomes the target rotation number. Herein, if the actual rotation number of the rotor 27 does not become the target rotation number, it can be estimated that the action resistance of the wiper arm 15, in other words, the actuation load of the wiper arm 15 is increased by snow or the like.

Also, if the vehicle speed is different, the wind pressure received by the wiper arm 15 is changed, and, therefore, the actuation load of the wiper arm 15 is different. Furthermore, if the inclination angle of the windshield 11 is different, the wind pressure received by the wiper arm 15 is changed, and, therefore, the actuation load of the wiper arm 15 is different. The inclination angle of the windshield 11 is expressed by the acute-angle-side inclination angle of the windshield 11 with respect to the horizontal plane. Furthermore, the actuation load of the wiper arm 15 is varied depending on the length of the wiper blade 16.

Note that the gear case 31 is provided with attachment parts 46, for example, three attachment parts, and the attachment parts 46 are provided with shaft holes, respectively. Furthermore, buffer materials 47 are attached to the shaft holes of the attachment parts 46, respectively. The buffer materials 47 are annularly formed synthetic rubbers, and screw members are inserted to holes 47a of the buffer materials 47 to attach the motor apparatus 17 to a vehicle body 48.

Next, a control example which can be executed by the brushless motor 18 in each of the first wiper apparatus 12 and the second wiper apparatus 13 will be described. The on/off of the switching elements 38a are controlled by the manipulation signals of the wiper switch 44 or a condition other than the manipulation signals of the wiper switch 44. Furthermore, on the basis of the detection signals of the three sensors 41, 42, and 43, the control circuit 50 estimates the rotation position of the rotor 27, in other words, the angle thereof in a rotation direction and carries out energization control on the basis of the rotation position of the rotor 27. More specifically, the positive-electrode-side switching elements of the phases are sequentially turned on respectively by predetermined angles in electric angles, in other words, energization angles, and the negative-electrode-side switching elements of the phases, which are different from the positive-electrode-side switching elements, are sequentially turned on by predetermined energization angles, thereby switching the energization state with respect to the armature coils U1, U2, V1, V2, W1, and W2 and commutating phase currents.

When the above described control is repeated, a rotating magnetic field is formed by the armature 21, and the rotor 27 is rotated. The brushless motor 18 can subject the rotor 27 to forward rotations, stop, and backward rotations by subjecting the on and off of the switching elements 38a to switching control and inverting the directions of electric distribution to the armature coils U1, U2, V1, V2, W1, and W2. If the power of the rotor 27 is transmitted to the pivot shaft 14 via the speed reduction mechanism 19, the wiper arm 15 reciprocates within the range of a predetermined angle, and the windshield 11 is wiped off by the wiper blade 16.

Meanwhile, the brushless motor 18 has a characteristic that the rotation number of the rotor 27 is increased as the current value is increased. Furthermore, the brushless motor 18 has a characteristic that the torque of the rotor 27 is reduced as the rotation number of the rotor 27 is increased.

Furthermore, when the brushless motor 18 of this embodiment is to control the output, in other words, the rotation number and torque of the rotor 27, the brushless motor 18 can switch and execute first energization control, weak field control, and second energization control. The first energization control, the weak field control, and the second energization control are switched by various conditions such as the detection signals of the wiper switch 44, the detection signals of the vehicle-speed sensor 45, and the load of the wiper arm 15. Particularly, the weak field control is executed when there is a request to increase the rotation number of the rotor 27 compared with the first energization control. On the other hand, the second energization control is executed when there is a request to increase the torque of the rotor 27 compared with the first energization control.

Figure 8:
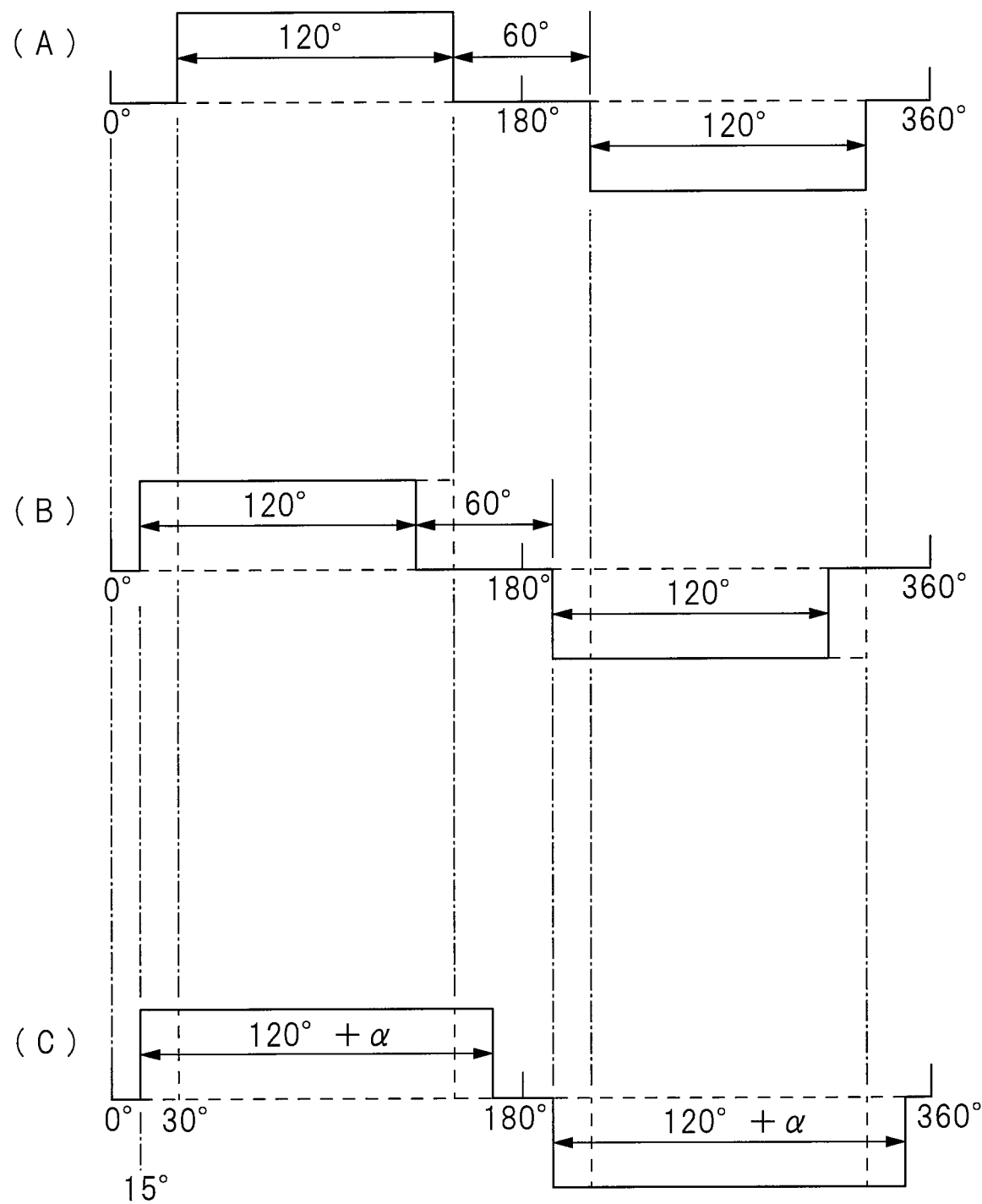
FIG. 8 shows diagrams showing an example of first to third energization controls, which can be executed by the brushless motor of the present invention.

The first energization control, the weak field control, and the second energization control will be described by FIG. 8. The angles 0° to 360° shown in FIG. 8 are the energization angles expressing the energization periods in one cycle of electric signals. The positive expresses that electric power is distributed from the positive electrode to the armature coils V1, V2, U1, U2, W1, and W2, and the negative expresses that electric power is distributed from the negative electrode to the armature coils V1, V2, U1, U2, W1, and W2. The energization control shown in FIG. 8 exemplifies the state of energization to a predetermined single armature coil.

Diagram (A) of FIG. 8 shows the first energization control. The first energization control uses an energization angle 0° as a reference, starts energization from the positive electrode to the predetermined armature coil at the position of an energization angle 30°, maintains the energization in the range of an energization angle 120°, and then terminates the energization from the positive electrode. Furthermore, the first energization control has an interval in the range of an energization angle 60° after the energization from the positive electrode is terminated, starts energization from the negative electrode to the predetermined armature coil, maintains the energization in the range of an energization angle 120°, and then terminates the energization.

Diagram (B) of FIG. 8 shows the weak field control. With respect to the predetermined armature coil, an energization angle 0° serves as a reference, energization from the positive electrode is started at the position of an energization angle 15°, the energization from the positive electrode is maintained in the range of an energization angle 120°, and, then, the energization from the positive electrode is terminated. Furthermore, with an interval in the range of an energization angle 60° after the energization from the positive electrode is terminated, energization from the negative electrode is started, the energization from the negative electrode is maintained in the range of an energization angle 120°, and, then, the energization from the negative electrode is terminated. In this manner, the position of the energization angle 15° at which the energization from the positive electrode is started in diagram (B) of FIG. 8 is the timing earlier than the position of the energization angle 30° shown in diagram (A) of FIG. 8. The position of the energization angle 15° has undergone angle advancement by the amount corresponding to the energization angle 15°.

The second energization control will be described on the basis of diagram (C) of FIG. 8. With respect to the predetermined armature coil, an energization angle 0° serves as a reference, energization from the positive electrode is started at the position of an energization angle 15°, the energization from the positive electrode is maintained in the range of an energization angle 120°+α, and, then, the energization from the positive electrode is terminated at the position of an energization angle 165°. Furthermore, after the energization from the positive electrode is terminated, energization from the negative electrode is started at an energization angle 195°, the energization from the negative electrode is maintained in the range of an energization angle 120°+α, and, then, the energization from the negative electrode is terminated. In this manner, the energization timing in the second energization control is earlier than the energization starting timing of the first energization control by the range of the energization angle 15°, and the range of the energization angle 120°+α, in which the energization is continued in the second energization control, is wider than the range of the energization angle 120° in which the energization is continued in the first energization control. Herein, the range of the energization angle 120° is a first period of the present invention, and the range of the energization angle 120°+α is a second period of the present invention.

The first energization control is executed, for example, when the low-speed mode is selected. The first energization control causes the actual rotation number of the rotor 27 to be closer to the required target rotation number by controlling the duty ration without carrying out the weak field control. Furthermore, with the first energization control carried out, the timing to start energization to the armature coils U1, U2, V1, V2, W1, and W2 is at the position of a fixed value determined in advance, in other words, the energization angle 30°.

The weak field control or the second energization control is executed, for example, when the high-speed mode is selected. The weak field control is executed without changing the current values supplied to the armature coils U1, U2, V1, V2, W1, and W2. The weak field control is the control in which the magnetic field formed by the armature 21 is weakened as much as possible by supplying currents to the armature coils U1, U2, V1, V2, W1, and W2. When this weak field control is carried out, the back electromotive force generated at the armature coils U1, U2, V1, V2, W1, and W2 is reduced, and the rotation number of the rotor 27 is increased. Note that the second energization control is to cause the energization period to be longer than that of the first energization control and the second energization control in addition to the weak field control.

Figure 9:
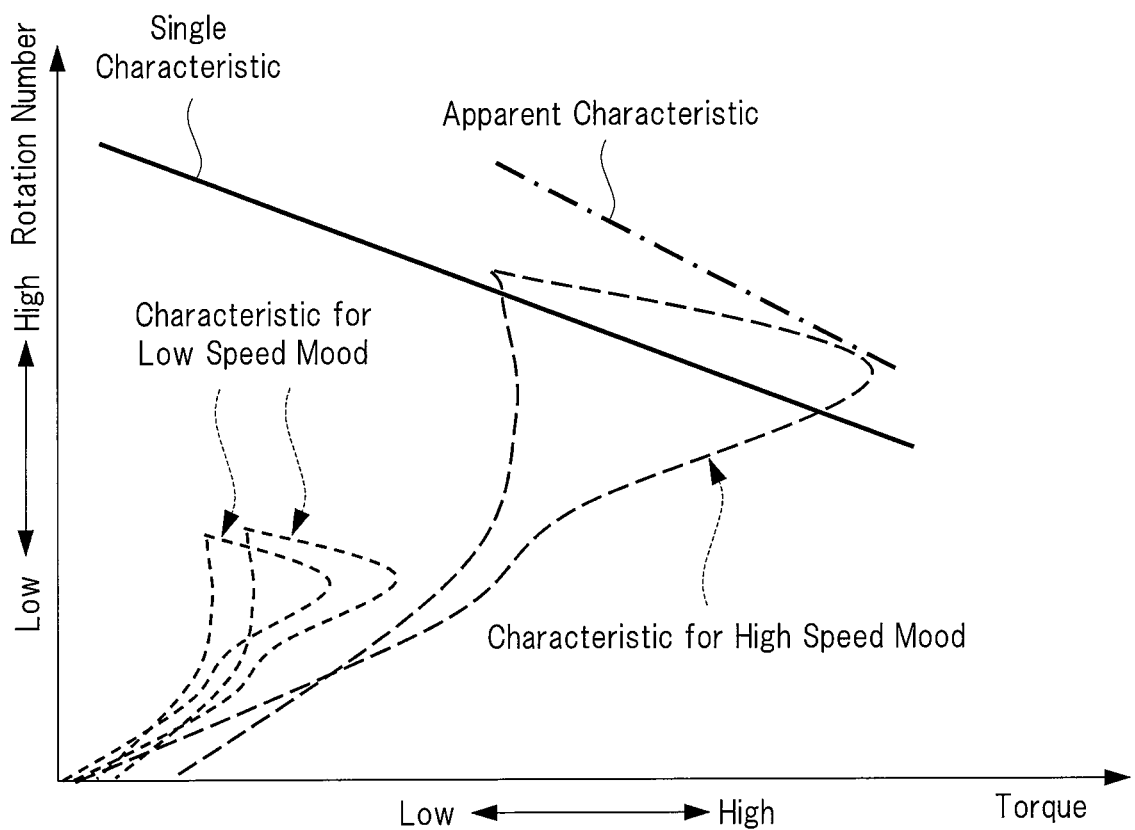
FIG. 9 is a diagram showing characteristics of the brushless motor of the present invention.

FIG. 9 is a diagram showing characteristics of the brushless motor 18. In FIG. 9, the rotation number of the brushless motor 18 is shown by a vertical axis, and the torque of the brushless motor 18 is shown by a horizontal axis. Furthermore, FIG. 9 shows an example of the characteristics for the low-speed mode and an example of high-speed mode characteristics.

In the brushless motor 18 of this embodiment, for example, a single characteristic is present at the position shown by a solid line so that the rotation number and torque corresponding to the low-speed mode characteristic of FIG. 9 can be obtained when the rating thereof is set. Therefore, if the low-speed mode is selected, the required rotation number and torque can be obtained in the range equal to and blow the single characteristic by executing the first energization control.

The single characteristic is the target output of the case in which the actual vehicle speed of the vehicle 10 is equal to or less than a reference vehicle speed, in other words, is the characteristic that satisfies the low-speed mode. An apparent characteristic is the target output of the case in which the actual vehicle speed of the vehicle 10 exceeds the reference vehicle speed, in other words, is the characteristic that satisfies the high-speed mode. The target output can be expressed by the rotation number and torque of the rotor 27. The conditions that determine the target output include various conditions such as the detection signals of the wiper switch 44, the detection signals of the vehicle-speed sensor 45, and the load of the wiper arm 15.

On the other hand, for example, when the high-speed mode is selected and the torque and rotation number required to the rotor 27 exceed the single characteristic, the rotation number and torque exceeding the single characteristic can be obtained by executing the weak field control or the second energization control by the control circuit 50. As a result, the characteristic of the brushless motor 18 is equivalent to the presence at the positions shown by a dashed-dotted line in FIG. 9 in terms of appearance.

Therefore, the brushless motor 18 can be subjected to determination of the rating thereof while using the low-speed mode as a reference in terms of design, and the size of the brushless motor 18 can be reduced as much as possible. The fact that the rotation number of the brushless motor 18 can be increased and the torque can be increased without changing the current value means that a torque constant is relatively increased. In other words, the brushless motor 18 of this embodiment can generate high torque as much as possible with smaller electric power consumption, and motor efficiency is improved.

Figure 10A:
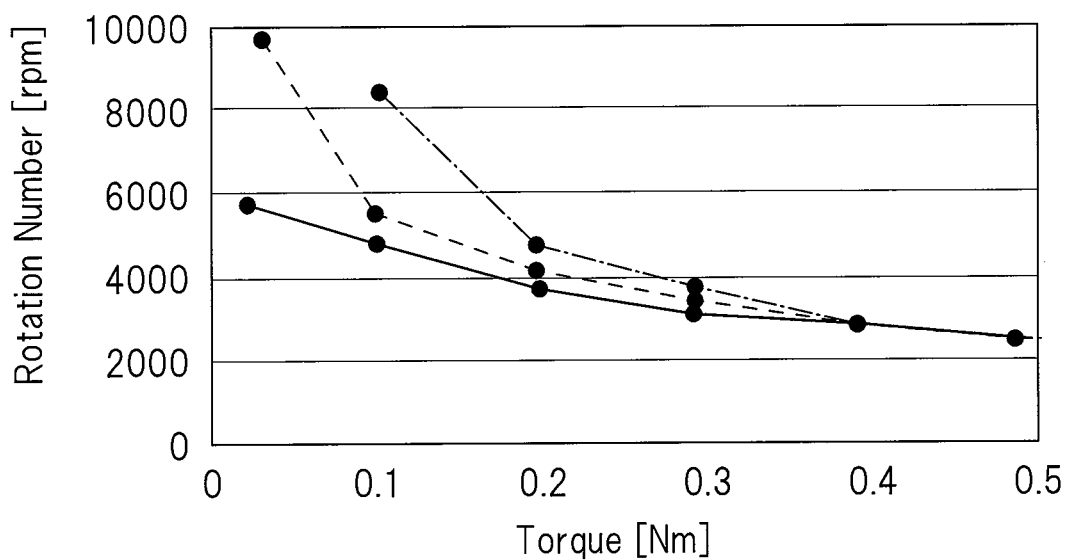
FIGS. 10A and 10B are diagrams showing the relations between torque and rotation numbers of the brushless motor of the present invention.
Figure 10B:
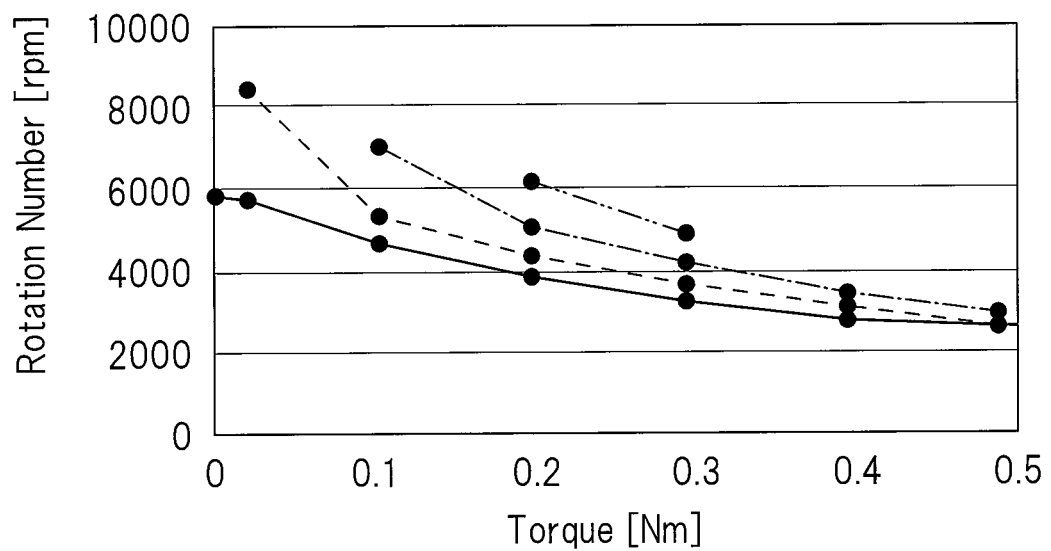

The characteristics of the brushless motor 18 of the case in which the weak field control or the second energization control is carried out will be described on the basis of the characteristic diagrams of FIGS. 10A and 10B. In the characteristic diagrams of FIG. 10, torque is shown by horizontal axes, and rotation numbers are shown by vertical axes. The characteristic diagram of FIG. 10A shows the characteristics of the brushless motor 18 in the case in which the second energization control is executed. A solid line represents the characteristic of an advance angle 30°, a broken line represents the characteristic of an advance angle 45°, and a dashed-dotted line represents the characteristic of an advance angle 60°. The above described advance angle 30°, advance angle 45°, and advance angle 60° mean that the energization to the armature coil is started at the timing earlier by the advance angle 30°, the advance angle 45°, and the advance angle 60° than the position of the energization angle 30°, which is the timing at which the energization to the armature coil is started in the first energization control.

The period of the energization to the armature coil is continued across the range of the energization angle 120° regardless of the advance angle. According to FIG. 10A, it can be understood that the rotation number of the rotor is relatively increased as the advance angle is increased even if the torque of the rotor is the same. Furthermore, in the three characteristics, the rotation number is reduced as the torque of the rotor is increased. Furthermore, as the torque of the rotor is increased, the differences in the rotation numbers of the rotor in the three characteristics are reduced.

The characteristics of the brushless motor 18 in the case in which the second energization control is carried out will be described on the basis of FIG. 10B. A solid line represents the characteristic of an energization angle 120° with an advance angle 30°, a broken line represents the characteristic of an energization angle 135° with an advance angle 37.5°, a dashed-dotted line represents the characteristic of an energization angle 150° with an advance angle 45°, and a dashed two-dotted line represents the characteristic of an energization angle 165° with an advance angle 52.5°. The basic characteristics of the brushless motor 18 shown in FIG. 10B are the same as the basic characteristics of the brushless motor 18 shown in FIG. 10A. The differences in the rotation numbers in the high-torque region are larger in the characteristics of the brushless motor 18 shown in FIG. 10B than the characteristics of the brushless motor 18 shown in FIG. 10A.

Figure 11:
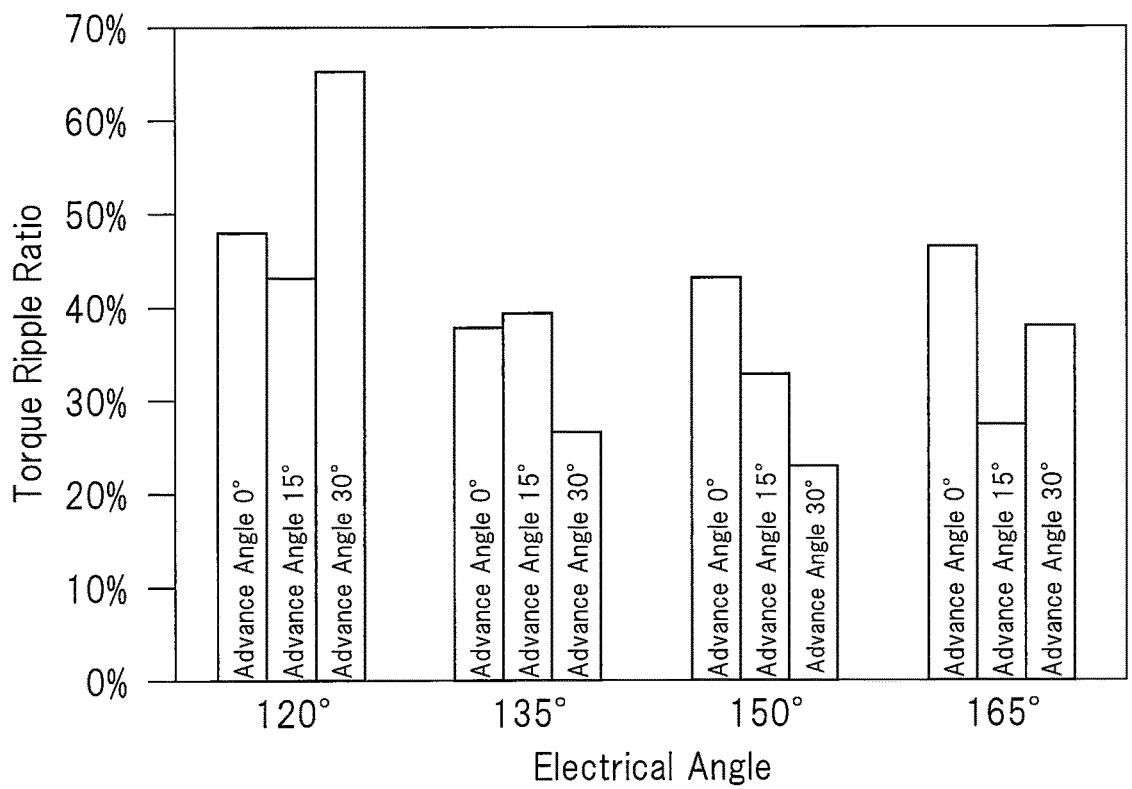
FIG. 11 is a diagram showing a torque ripple rate of the brushless motor of the present invention.

FIG. 11 is a graph chart showing the relation between the advance angles, the energization angles, and torque ripple rates. The horizontal axis shows the energization angles. Torque ripples mean changes, in other words, pulsations of the torque of the rotor. The torque ripple rate is the ratio of the pulsation width of the torque with respect to the average of the torque. Herein, the torque ripple rates of the rotor with respect to an advance angle 0°, an advance angle 15°, and an advance angle 30°, respectively, are shown. The advance angle 0° corresponds to first timing of the present invention, and the advance angle 15° and the advance angle 30° correspond to second timing of the present invention. Therefore, the advance angle 15° means advancing the timing to start energization by the amount corresponding to the energization angle 15° with respect to the advance angle 0°, and the advance angle 30° means to advance the timing to start energization by the amount corresponding to the energization angle 30° with respect to the advance angle 0°.

According to the graph chart of FIG. 11, it can be understood that, if the energization angle is constant, the larger the advance angle becomes, the smaller the torque ripple rate becomes. On the other hand, it can be understood that, if the advance angle is constant, there is an inclination that the larger the energization angle becomes, the smaller the torque ripple rate becomes. Specifically, it can be understood that, if the brushless motor 18 is controlled by the energization angle 150° and the advance angle 30°, the torque ripple rate becomes the lowest. Note that, when the first energization control and the second energization control are compared with each other, in a case of the energization angle 135° or more and the energization angle 165°, the torque ripple rate in the case in which the second energization control is executed can be reduced more than the torque ripple rate in the case in which the first energization control is executed.

Figure 12:
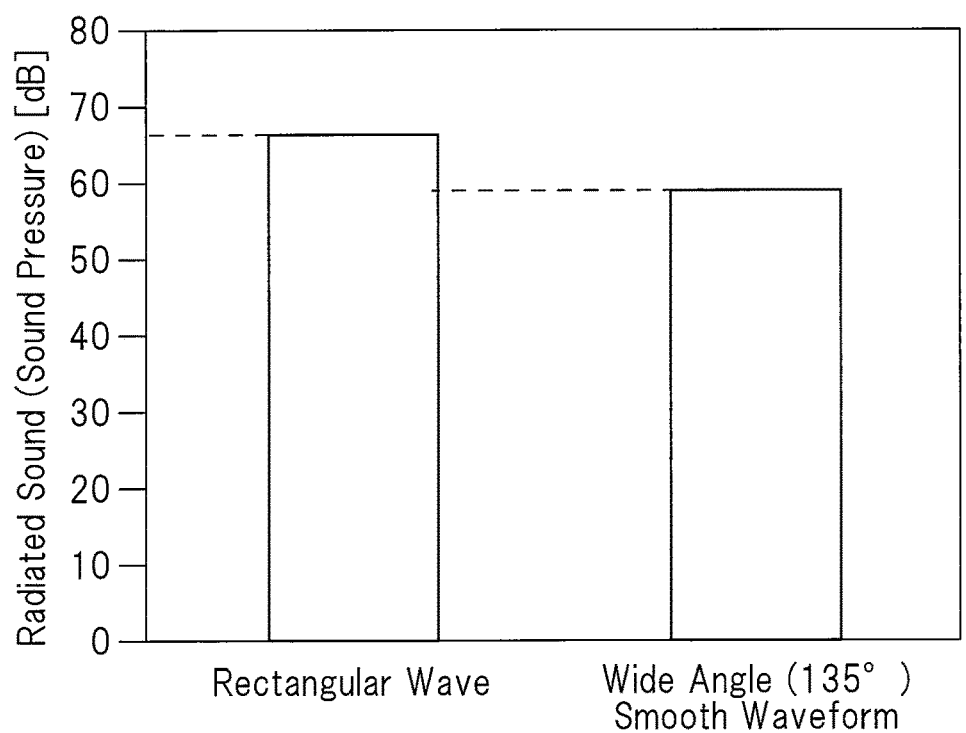
FIG. 12 is a diagram showing sound pressure characteristics of the brushless motor of the present invention.

FIG. 12 shows an example of comparing the radiated sound (sound pressures) generated around the brushless motor in the case in which control is carried out by using rectangular waves as current waveforms and the case in which control is carried out by the waveforms smoother than the rectangular waves when control of the energization to the armature coil of the brushless motor 18 is executed. When the first energization control is executed, the current waveform becomes a rectangular wave. When the second energization control is executed, the current waveform becomes a smooth waveform. According to FIG. 12, it can be understood that the sound pressure in the case in which the second energization control is executed is lower than the sound pressure of the case in which the first energization control is executed.

Figure 13:
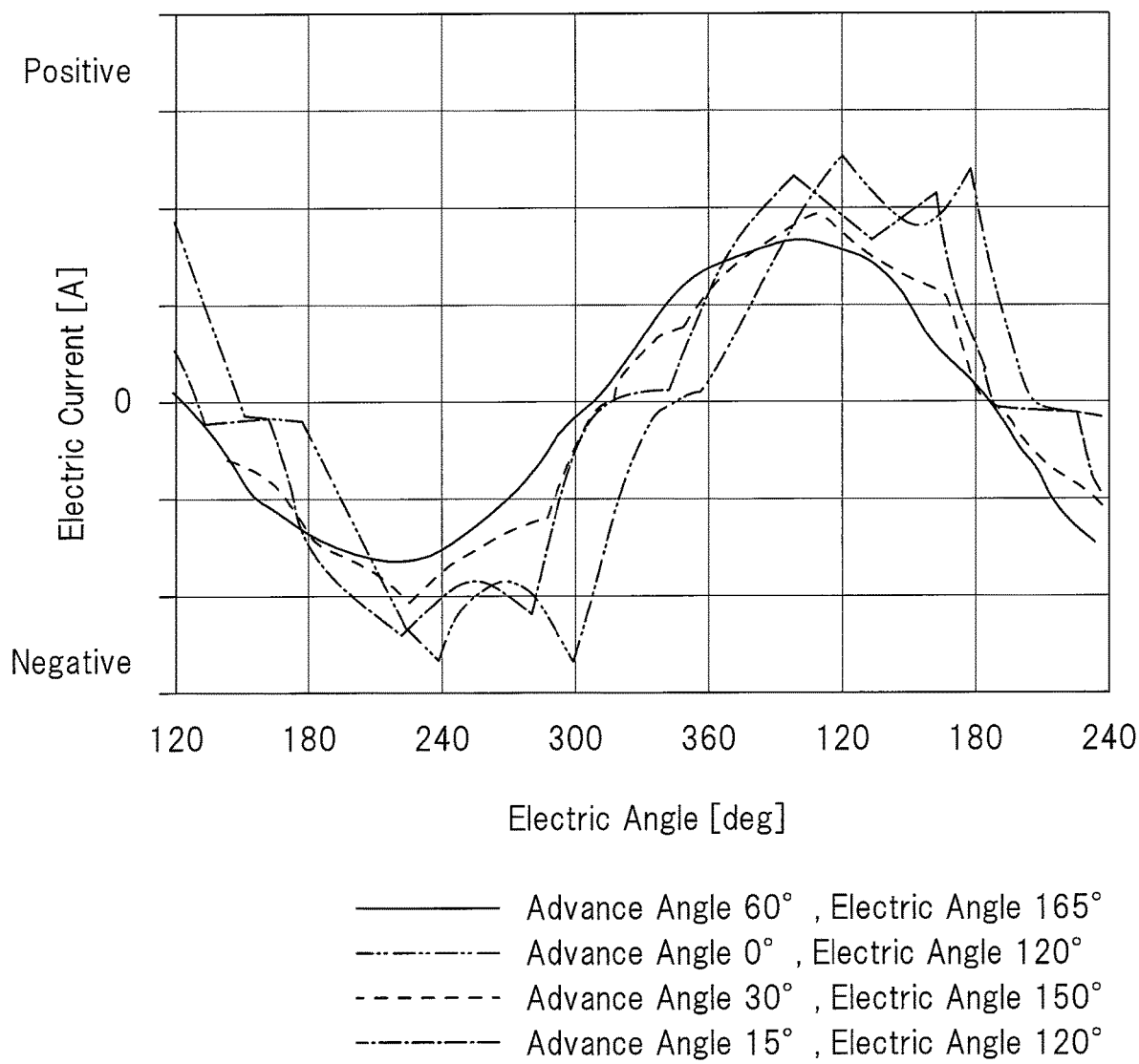
FIG. 13 is a diagram showing current waveforms of the brushless motor of the present invention, which is in power-on state.

FIG. 13 shows the waveforms showing the relations between currents and electric signals in the case in which the energization to the armature coil of the brushless motor 18 is executed. The waveform of the advance angle 60° and the energization angle 165° is shown by a solid line, the waveform of the advance angle 0° and the energization angle 120° is shown by a dashed two-dotted line, the waveform of the advance angle 30° and the energization angle 150° is shown by a broken line, and the waveform of the advance angle 15° and the energization angle 120° is shown by a dashed-dotted line. Among the waveforms shown in FIG. 13, the waveform of the advance angle 60° and the energization angle 165° has a most smoothly changed current and approximates a sine wave. More specifically, the waveform of the advance angle 60° and the energization angle 165° has the lowest radiated sound (sound pressure) generated around the brushless motor compared with the other waveforms and can reduce the actuation sound of the brushless motor 18.

Figure 14:
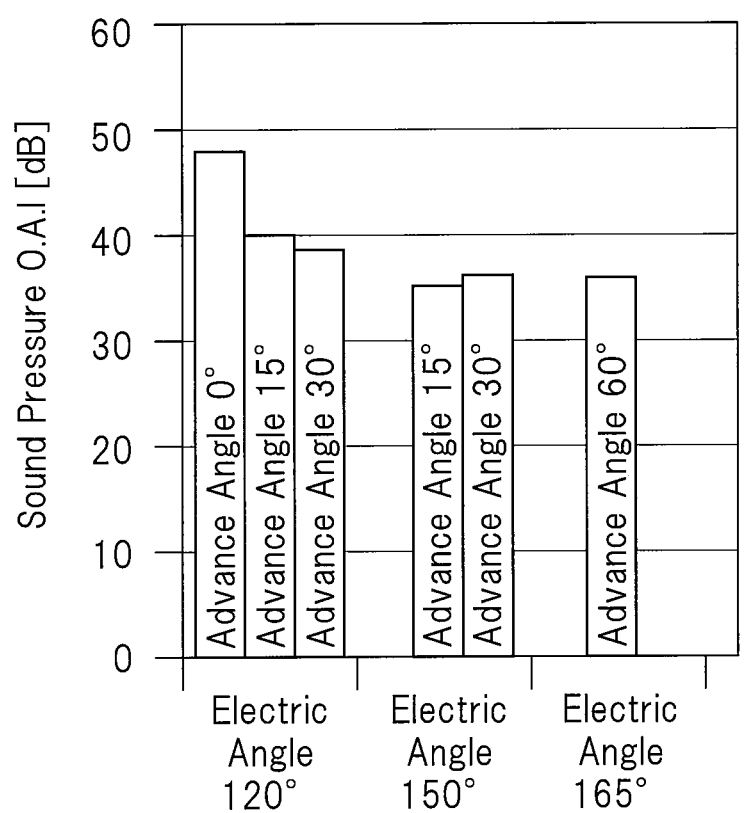
FIG. 14 is a diagram showing sound pressure characteristics of the brushless motor of the present invention.

FIG. 14 is a graph chart showing the relations between the advance angles, the energization angles, and sound pressures. FIG. 14 shows the sound pressures at the energization angle 120° with the advance angle 0°, the advance angle 15°, and the advance angle 30°, shows the sound pressures at the energization angle 150° with the advance angle 15° and the advance angle 30°, and shows the sound pressures at the energization angle 165° with the advance angle 60°. According to FIG. 14, it can be understood that the sound pressure at the advance angle 15° and the energization angle 150° and the sound pressure at the advance angle 60° and the energization angle 165° are lower than the sound pressures at the other advance angles and energization angles.

Herein, the advance angle 0° is the first timing, and the advance angle 15° and the advance angle 30° are the second timing. Furthermore, the advance angle 60° may be the second timing at which the timing to start energization is advanced by the amount corresponding to the energization angle 60° with respect to the advance angle 0°, which is the first timing.

On the basis of the inclinations shown in FIGS. 12 to 14, it can be understood that there is an inclination that, if the energization angle is constant, the larger the advance angle becomes, the lower the sound pressure becomes. Furthermore, it can be understood that there is an inclination that, if the advance angle is constant, the larger the energization angle becomes, the lower the sound pressure becomes.

In this embodiment, when the energization to the armature coil of the brushless motor 18 is controlled, the advance angle and the energization angle can be controlled in accordance with various conditions such as the selected mode, the vehicle speed, and the load of the wiper arm 15 so that the torque ripple rate becomes small. Furthermore, when the energization to the armature coil of the brushless motor 18 is controlled, the advance angle and the energization angle can be controlled in accordance with the various conditions so that the sound pressure becomes low.

Furthermore, the rigidity, the attachment position, etc. of the vehicle body 48 to which the motor apparatus 17 is attached is different in every vehicle model, and the resonant frequency in the case in which the brushless motor 18 is actuated is different in every vehicle model. Therefore, the advance angle and the energization angle can be tuned for every vehicle model so that the sound pressure generated around the brushless motor 18 becomes low.

The drive apparatus of the present invention is not limited to that of the above described first embodiment, and it goes without saying that various modifications can be made within the range not deviating from the gist thereof. For example, the brushless motor of the present invention includes the structure of a star connection in which armature coils are connected in Y shapes. The brushless motor of the present invention includes one in which the rotor has an IPM (Interior Permanent Magnet) structure. In the IPM structure, permanent magnets are buried in the rotor core. Meanwhile, the first period is not limited to the energization angle 120°, but may be less than the energization angle 120°, or may exceed the energization angle 120°.

The brushless motor of the present invention includes the inner-rotor-type structure in which the rotor is disposed in the inner side of the stator and an outer-rotor-type structure in which the rotor is disposed in the outer side of the stator.

The wiper apparatus of the present invention includes a wiper apparatus in which the wiper blade wipes off a rear glass. Thus, the wind glass of the wiper apparatus of the present invention includes a windshield and a rear glass. Furthermore, the wiper apparatus of the present invention includes a configuration in which two wiper arms are singularly driven by a single brushless motor.

The brushless motor of the first embodiment includes, other than the wiper motor that operates the wiper apparatus, brushless motors provided for operating action members such as a door, a roof, a glass, etc. in, for example, a power slide door apparatus, a sunroof apparatus, or a power window apparatus provided in a vehicle. Note that the drive apparatus 37 corresponds to a control unit and a mode switching unit of the present invention.

Second Embodiment

The second embodiment is one example of a motor apparatus applied to the vehicle. FIGS. 2-5 and 9 used in the first embodiment will be used also in the second embodiment.

Figure 15:
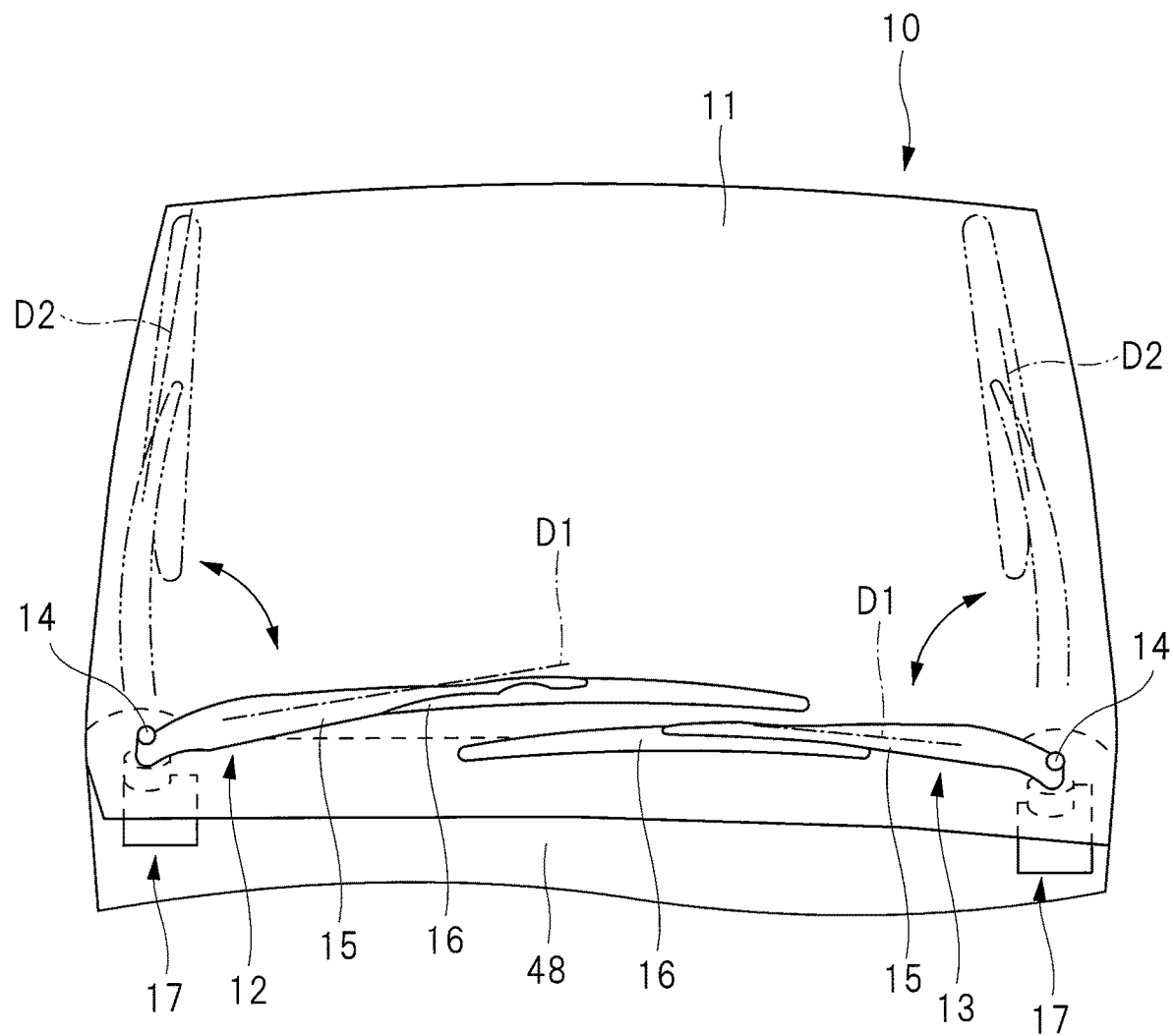
FIG. 15 is a schematic diagram showing an example in which a motor apparatus of the present invention is used for driving a wiper apparatus of a vehicle.

A vehicle 10 shown in FIG. 15 has a windshield 11. Furthermore, the vehicle 10 has a first wiper apparatus 12 and a second wiper apparatus 13, which wipe off the windshield 11. The first wiper apparatus 12 and the second wiper apparatus 13 are disposed at the positions which are different from each other in the width direction of the vehicle 10. Since the first wiper apparatus 12 and the second wiper apparatus 13 have approximately left-right symmetric structures, the first wiper apparatus 12 will be described hereinafter for the sake of convenience. The first wiper apparatus 12 has: a wiper arm 15 which swings about a pivot shaft 14; and a wiper blade 16 which is attached to the wiper arm 15. Furthermore, the first wiper apparatus 12 has a motor apparatus 17 which drives the wiper arm 15. The motor apparatus 17 is provided with: a brushless motor 18; and a speed reduction mechanism 19 which transmits the power of the brushless motor 18 to the pivot shaft 14.

The brushless motor 18 is formed as shown in FIGS. 2 to 4. The brushless motor 18 in this embodiment has a motor case 20 formed into a bottomed cylindrical shape, and an armature 21 serving as a stator is provided on an inner periphery of the motor case 20. The armature 21 has a stator core 22 and armature coils V1, V2, U1, U2, W1, and W2 wound around the stator core 22. The stator core 22 is stacked electrically-conductive metal plates, and, on the inner periphery of the stator core 22, a plurality of, specifically, six teeth 23 are provided at intervals in the circumferential direction and disposed at a mechanical angle of 60°. The armature coils V1, V2, U1, U2, W1, and W2 are separately wound around the six teeth 23, respectively.

The armature coils V1 and V2 correspond to V-phases, the armature coils U1 and U2 correspond to U-phases, and the armature coils W1 and W2 correspond to W-phases. In FIG. 4, clockwise with respect to the armature 21, the armature coil U1, the armature coil V1, the armature coil W1, the armature coil U2, the armature coil V2, and the armature coil W2 are provided in this order. The armature coils U1 and U2 are in positional relationship of mechanical angle 180° with each other, the armature coils V1 and V2 are in positional relationship of mechanical angle 180° with each other, and the armature coils U1 and U2 are in positional relationship of mechanical angle 180° with each other.

Next, the configuration of the armature 21 will be described with reference to FIGS. 5 and 16. The armature coils U1 and U2 are connected in series, the armature coils V1 and V2 are connected in series, and the armature coils W1 and W2 are connected in series, Furthermore, an end "Ua" of the armature coil U1 and an end "Ub" of the armature coil W2 are connected by a terminal 24. Also, an end "Vb" of the armature coil U2 and an end "Va" of the armature coil V1 are connected by a terminal 25. Furthermore, an end "Wa" of the armature coil W1 and an end "Wb" of the armature coil V2 are connected by a terminal 26. In this manner, the brushless motor 18 employs delta connections as the connection structure of the six armature coils V1, V2, U1, U2, W1, and W2.

On the other hand, the brushless motor 18 has a rotor 27, and the rotor 27 is provided in the inner side of the armature 21. The brushless motor 18 has an inner-rotor-type structure in which the rotor 27 is disposed in the inner side of the armature 21, which is serving as a stator. The rotor 27 has a rotor shaft 28 and permanent magnets 29N and 29S of four polarities fixed to an outer periphery of the rotor shaft 28 via a rotor core 30. The polarity of the two permanent magnets 29N is the N pole, the polarity of the two permanent magnets 29S is the S pole, and the permanent magnets 29N and the permanent magnets 29S are alternately disposed along the circumferential direction of the rotor shaft 28. The brushless motor 18 has four permanent magnets, six armature coils, and a four-pole six-slot structure.

In this manner, the brushless motor 18 has a SPM (Surface Permanent Magnet) structure. The SPM structure is a structure in which the permanent magnets 29N and 29S are fixed to the outer peripheral surface of the rotor core 30. The rotor core 30 is formed of an iron-based magnetic material. Furthermore, the rotor shaft 28 is rotatably supported by a plurality of, specifically, two bearings 49.

On the other hand, the motor apparatus 17 is provided with a gear case 31, which houses the speed reduction mechanism 19, and the gear case 31 and the motor case 20 are fixed by a fastener member (not shown). Part of the rotor shaft 28 in the length direction is disposed in the motor case 20, and the remaining part thereof is disposed in the gear case 31. A worm 32 is formed on the outer periphery of the part of the rotor shaft 28 that is disposed in the gear case 31. A worm wheel 33 is provided in the gear case 31. A gear 33a is formed on the outer periphery of the worm wheel 33, and the gear 33a and the worm 32 are meshed with each other.

The pivot shaft 14 is disposed concentrically with the worm wheel 33, and the pivot shaft 14 is integrally rotated with the worm wheel 33. The worm 32 and the gear 33a are the speed reduction mechanism 19 in this embodiment. The speed reduction mechanism 19 is a mechanism which reduces the rotation number (output rotation number) of the pivot shaft 14 with respect to the rotation number (input rotation number) of the rotor 27 when the power of the rotor 27 is transmitted to the pivot shaft 14. The rotation number in this embodiment is the rotation number per unit time and is synonymous with a rotation speed.

Furthermore, in FIG. 3, in an upper part of the gear case 31, a shaft hole (not shown) is provided. The end of the pivot shaft 14 that is in the opposite side of the end to which the worm wheel 33 is fixed is exposed to outside via the shaft hole of the gear case 31. The wiper arm 15 is coupled to the part of the pivot shaft 14 that is exposed to outside the gear case 31.

On the other hand, a sensor magnet 34 is attached to the part of the rotor shaft 28 that is disposed in the gear case 31. The sensor magnet 34 is integrally rotated with the rotor shaft 28. The sensor magnet 34 has a cylindrical shape, and the sensor magnet 34 is magnetized so that N poles and S poles are alternately juxtaposed along the circumferential direction of the rotor shaft 28.

An opening is provided at a part of the gear case 31 that is in the opposite side of the shaft hole thereof. This opening is formed for inserting the worm wheel 33, the pivot shaft 14, etc. into the gear case 31. An under cover 35, which closes the opening, is provided. The under cover 35 has a tray shape, and a control board 36 is provided in the space surrounded by the under cover 35 and the gear case 31.

Figure 16:
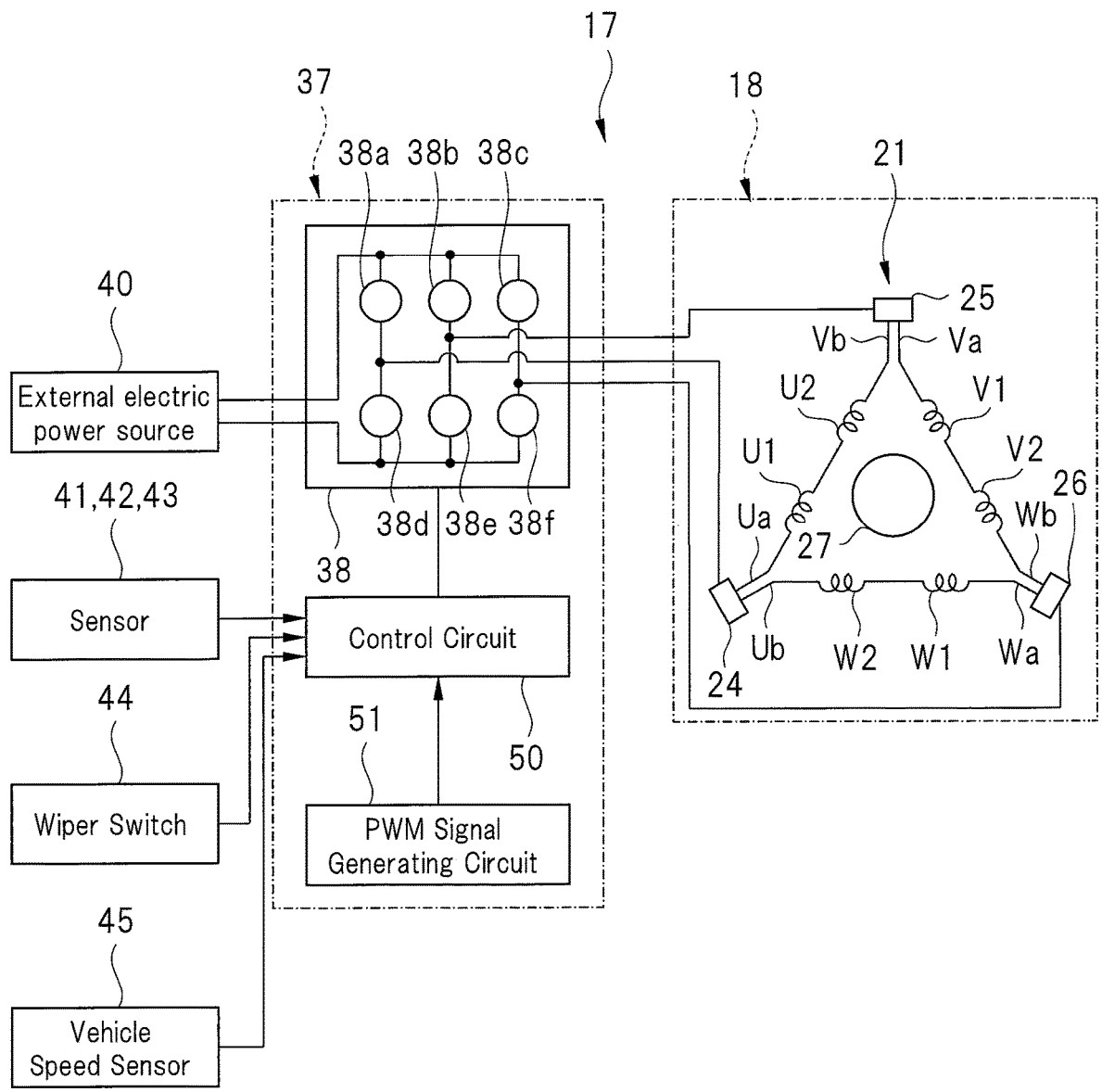
FIG. 16 is a block diagram showing a control system of the motor apparatus of the present invention.

As shown in FIG. 16, a drive apparatus 37, which controls the brushless motor 18, is provided on the control board 36. The drive apparatus 37 has an inverter circuit 38, which controls energization to the six armature coils V1, V2, U1, U2, W1, and W2. The inverter circuit 38 is connected to the terminals 24, 25, and 26. Furthermore, the under cover 35 is provided with a connector 39; and, when an electric-power-source cable connected to an external electric power source 40 is connected to the connector 39, the external electric power source 40 and the inverter circuit 38 are connected to each other. The external electric power source 40 includes a battery, a capacitor, or the like mounted on the vehicle 10.

Furthermore, the inverter circuit 38 is provided with a plurality of, specifically, six switching elements 38a to 38f which separately connect or shut off supply paths between the external electric power source 40 and the six armature coils V1, V2, U1, U2, W1, and W2. The six switching elements 38a to 38f are composed of, for example, semiconductor elements such as FETs. More specifically, the positive-electrode-side switching element 38b corresponding to the U-phase and connected to the positive electrode of the external electric power source 40 and the negative-electrode-side switching element 38e corresponding to the U-phase and connected to the negative electrode side of the external electric power source 40 are provided.

Furthermore, the positive-electrode-side switching element 38b corresponding to the V-phase and connected to the positive electrode of the external electric power source 40 and the negative-electrode-side switching element 38e corresponding to the V-phase and connected to the negative electrode side of the external electric power source 40 are provided. Furthermore, the positive-electrode-side switching element 38c corresponding to the W-phase and connected to the positive electrode of the external electric power source 40 and the negative-electrode-side switching element 38f corresponding to the W-phase and connected to the negative electrode side of the external electric power source 40 are provided.

Herein, the switching elements 38a, 38b, and 38c are connected in mutually parallel, and the switching elements 38d, 38e, and 38f are connected in mutually parallel. Furthermore, the switching element 38a and the switching element 38d are connected in series, the switching element 38b and the switching element 38e are connected in series, and the switching element 38c and the switching element 38f are connected in series. Furthermore, a source of the switching element 38a and a drain of the switching element 38d are connected to the terminal 24. Furthermore, a source of the switching element 38b and a drain of the switching element 38e are connected to the terminal 25. Furthermore, a source of the switching element 38c and a drain of a switching element 38f are connected to the terminal 26.

Furthermore, the drive apparatus 37 is provided with a control circuit 50 for controlling the six switching elements 38a to 38f. The control circuit 50 is a publicly-known microcomputer provided with a CPU, a RAM, a ROM, etc. Furthermore, the drive apparatus 37 has a PWM-signal generating circuit 51, and the signals of the PWM-signal generating circuit 51 are input to the control circuit 50. The control circuit 50 outputs drive signals which separately control the six switching elements 38a to 38f, and the PWM signals are superimposed on the drive signals. Therefore, the switching elements 38a to 38f are driven by PWM control and are intermittently turned on/off in respective energization periods.

In addition, the values of the currents supplied to the six armature coils V1, V2, U1, U2, W1, and W2 are controlled by controlling ratios at which the switching elements 38a to 38f are separately turned on, in other words, "duty ratios". In other words, the energization periods in which electric power is supplied to the six armature coils V1, V2, U1, U2, W1, and W2 can be increased/reduced between 0% and 100% with respect to the entire period in which electric power can be distributed. Here, when waves of currents to be respectively supplied to the armature coils V1, V2, U1, U2, W1, and W2 are represented by electric angles, the "energization periods" have important implications.

Furthermore, the brushless motor 18 of this embodiment can rotate the rotor 27 forward/backward by subjecting the on and off of the switching element 38a to switching control and inverting the directions of energization to the six armature coils V1, V2, U1, U2, W1, and W2.

The control board 36 is disposed along the planar direction which is perpendicular to a first axis A1 of the pivot shaft 14. The first axis A1 serves as a center when the pivot shaft 14 rotates. Three sensors 41, 42, and 43 are attached to the control board 36. All of the three sensors 41, 42, and 43 are Hall ICs, and the three sensors 41, 42, and 43 are fixed to the control board 36 without contacting the sensor magnet 34. In this embodiment, the sensor 41 outputs a switching signal corresponding to the W-phase, the sensor 42 outputs a switching signal corresponding to the V-phase, and the sensor 43 outputs a switching signal corresponding to the U-phase. The three sensors 41, 42, and 43 are arranged in the direction intersecting with a second axis B1 of the rotor shaft 28 as shown in FIG. 2 by a planar view of the control board 36. The second axis B1 serves as a center when the rotor shaft 28 rotates.

The disposition range of the three sensors 41, 42, and 43 and the disposition range of the sensor magnet 34 are overlapped with each other at least partially in the direction along the second axis B1. Furthermore, if it is assumed that the control board 36 is horizontally disposed, as shown in FIG. 3, the single sensor 42 corresponding to V-phase is disposed immediately below the second axis B1. The three sensors 41, 42, and 43 are disposed at equal intervals in the direction intersecting with the second axis B1. Furthermore, the sensor 42 is disposed between the sensor 41 and the sensor 43.

When the rotor 27 is rotated and moves the magnetic poles of the sensor magnet 34, the three sensors 41, 42, and 43 carry out switching operations, and the three sensors 41, 42, and 43 separately generate switching signals (output signals), respectively. On the basis of the switching signals of the three sensors 41, 42, and 43, the control circuit 50 can detect the rotation phase and the rotation number of the rotor 27. The rotation phase of the rotor 27 is an angle or a position in a rotation direction defined with respect to a reference position. The control circuit 50 further has a function to estimate an actuation load on the basis of the switching signals of the three sensors 41, 42, and 43.

Furthermore, a wiper switch 44 is provided in the interior of the vehicle 10. When a driver manipulates the wiper switch 44 and selects a low-speed mode or a high-speed mode, manipulation signals of the wiper switch 44 are input to the control circuit 50. Furthermore, a vehicle-speed sensor 45, which detects the travelling speed of the vehicle 10, is provided, and detection signals of the vehicle-speed sensor 45 are input to the control circuit 50.

Furthermore, the control circuit 50 stores, in advance, data of outputs from the rotor 27 of the brushless motor 18, that is, data of energization pattern and the like of the six armature coils V1, V2, U1, U2, W1, and W2, in order to control the rotation number and the torque. More specifically, the control circuit 50 stores, in advance, data, arithmetic expressions, etc. that control the timing to turn on/off the switching elements 38*a* of the inverter circuit 38, the duration time to turn on the switching elements 38*a* to 38*f* on the basis of various conditions such as the manipulation signals of the wiper switch 44, the detection signals of the vehicle-speed sensor 45, and the actuation load of the wiper arm 15.

The actuation load of the wiper arm 15 can be specifically estimated from the switching signals of the sensors 41, 42, and 43. In the control circuit 50, for example, it is assumed that the high-speed mode is selected, a target rotation number of the rotor 27 to achieve a target wiping speed of the wiper arm 15 is obtained, and energization control is carried out so that the actual rotation number of the rotor 27 becomes the target rotation number. Herein, In the control circuit 50, if the actual rotation number of the rotor 27 does not become the target rotation number, it can be estimated that the action resistance of the wiper arm 15, in other words, the actuation load of the wiper arm 15 is increased by snow or the like.

Also, since the wind pressure received by the wiper arm 15 is changed depending on the vehicle speed, the actuation load of the wiper arm 15 is changed depending on the vehicle speed. Furthermore, the wind pressure received by the wiper arm 15 is changed depending on the inclination angle of the windshield 11, and, therefore, the actuation load of the wiper arm 15 is changed depending on the inclination angle of the windshield 11. The inclination angle of the windshield 11 is expressed by the acute-angle-side inclination angle of the windshield 11 with respect to the horizontal plane. Furthermore, the actuation load of the wiper arm 15 is changed depending on the length of the wiper blade 16.

Note that the gear case 31 is provided with attachment parts 46 at plural, for example, three locations, and the attachment parts 46 are provided with shaft holes, respectively. Furthermore, buffer materials 47 are attached to the shaft holes of the attachment parts 46, respectively. The buffer materials 47 are annularly formed synthetic rubbers, and screw members are inserted to holes 47*a* of the buffer materials 47 to attach the motor apparatus 17 to a vehicle body 48.

Next, a control example which can be executed by the motor apparatus 17 in order to control each of the first wiper apparatus 12 and the second wiper apparatus 13 will be described. In the control circuit 50 of the motor apparatus 17, the on/off of the switching elements 38*a* are controlled by the manipulation signals of the wiper switch 44 or a condition other than the manipulation signals of the wiper switch 44. Furthermore, on the basis of the detection signals of the three sensors 41, 42, and 43, the control circuit 50 estimates the rotation phase of the rotor 27, in other words, the angle thereof in a rotation direction and carries out energization control on the basis of the rotation phase of the rotor 27. More specifically, the positive-electrode-side switching elements 38*a* 38*b*, and 38*c* are sequentially turned on/off respectively by predetermined electric angles, in other words, energization angles, and the negative-electrode-side switching elements 38*d*, 38*e*, and 38*f* are sequentially turned on/off by predetermined electric angles, thereby switching the energization state with respect to the armature coils U1, U2, V1, V2, W1, and W2 and commutating phase currents.

When the above described control is repeated, a rotating magnetic field is formed by the armature 21, and the rotor 27 is rotated. The brushless motor 18 can subject the rotor 27 to forward rotations, stop, and backward rotations by subjecting the on and off of the switching elements 38*a* to 38*f* to switching control and inverting the directions of electric distribution to the armature coils U1, U2, V1, V2, W1, and W2. If the power of the rotor 27 is transmitted to the pivot shaft 14 via the speed reduction mechanism 19, the wiper arm 15 reciprocates within the range of a predetermined angle, and the windshield 11 is wiped off by the wiper blade 16.

In FIG. 15, the wiper arm 15 reciprocates, for example, between a lower inverting position D1 shown by a solid line and an upper inverting position D2 shown by a dashed two-dotted line. The upper inverting position D2 is at a position which is more distant than the lower inverting position D1 is from the vehicle body 48 to which the motor apparatus 17 is attached. The location at which the motor apparatus 17 is attached is, for example, a lower side of a louver.

Furthermore, the range in which the wiper arm 15 is moved from the lower inverting position toward the upper inverting position D2 is a forward path, and the range in which the wiper arm 15 is moved from the upper inverting position D2 toward the lower inverting position D1 is a return path. Note that it is assumed that, if the wiper arm 15 is moved in the forward path, the rotor 27 shown in FIG. 3 is rotated, for example, counterclockwise; and, if the wiper arm 15 is moved in the return path, the rotor 27 is rotated clockwise.

As described above, the control circuit 50 can control output of the rotor 27 by controlling the timing of the electric angles to turn on or off the switching elements 38*a* to 38*f*, the sections of the electric angles to turn on the switching elements 38*a* to 38*f*, etc. The timing of the electric angles can be also referred to as the points of the electric angles. The brushless motor 18 has a characteristic that the rotation number of the rotor 27 is increased as the current value is increased. Furthermore, the brushless motor 18 has a characteristic that the torque of the rotor 27 is reduced as the rotation number of the rotor 27 is increased.

Furthermore, when the brushless motor 18 of this embodiment controls the output, in other words, the rotation number and torque of the rotor 27, the brushless motor 18 can switch and execute first energization control, weak field control, and third energization control. The first energization control, the weak field control, and the third energization control are switched by various conditions such as the detection signals of the wiper switch 44, the detection signals of the vehicle-speed sensor 45, the load of the wiper arm 15, and the moving direction of the wiper arm 15. Particularly, the weak field control can be executed when there is a request to increase the rotation number of the rotor 27 compared with the first energization control. On the other hand, the third energization control can be executed when there is a request to increase the torque of the rotor 27 compared with the first energization control. That is, the third energization control is executed when the actuation load of the wiper arm 15 is increased by snow and the like deposited on the front windshield 11.

Figure 17:
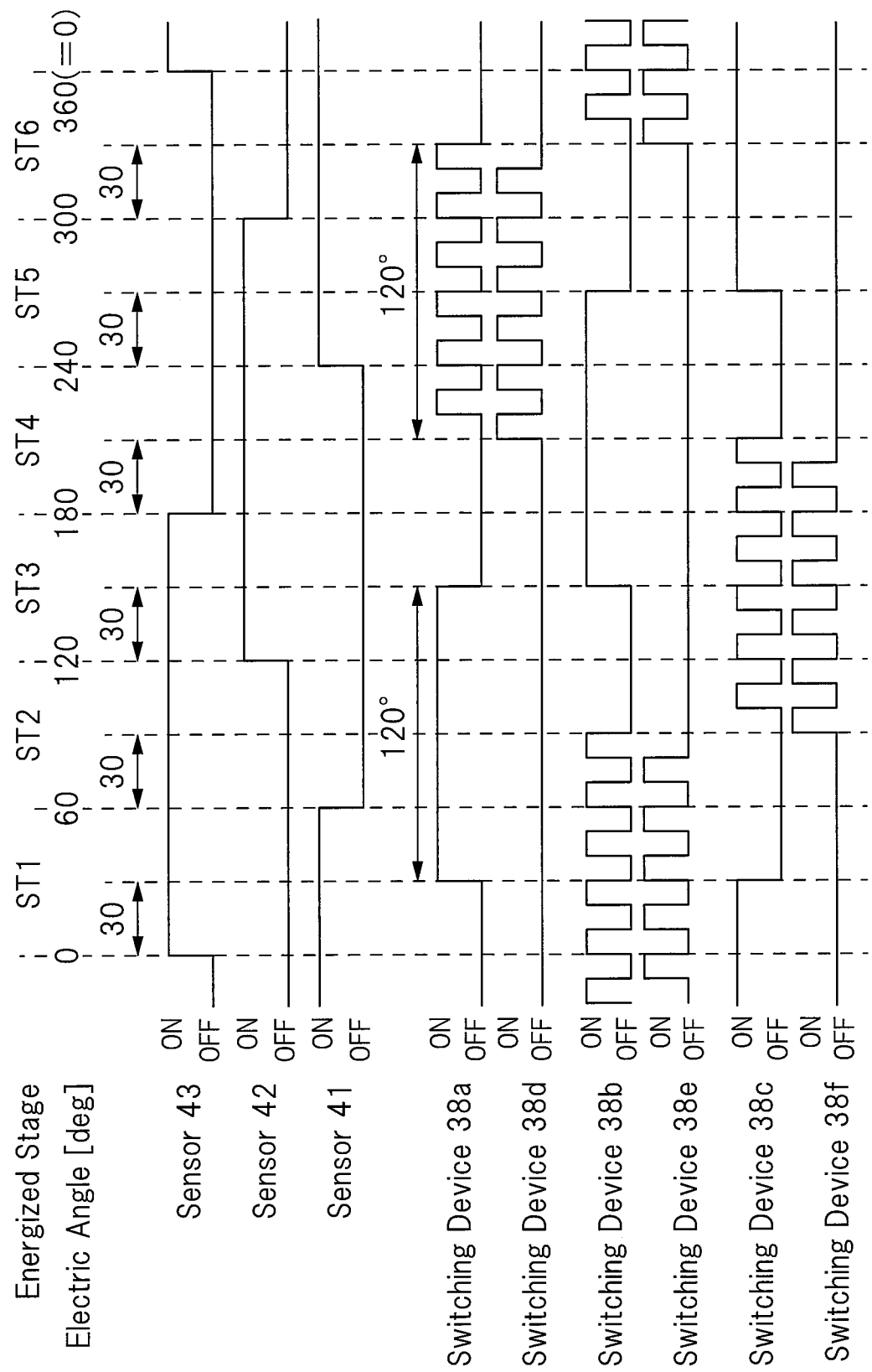
FIG. 17 is a time chart showing a drive pattern of first energization control executed by the motor apparatus of the present invention.

The drive patterns of the switching elements 38a to 38f in the first energization control will be described by the time charts of FIGS. 17 and 18. FIG. 17 shows the drive patterns of the switching elements 38a to 38f in the case in which the wiper arm 15 is moved in the forward path, and FIG. 18 shows the drive patterns of the switching elements 38a to 38f in the case in which the wiper arm 15 is moved in the return path.

Figure 18:
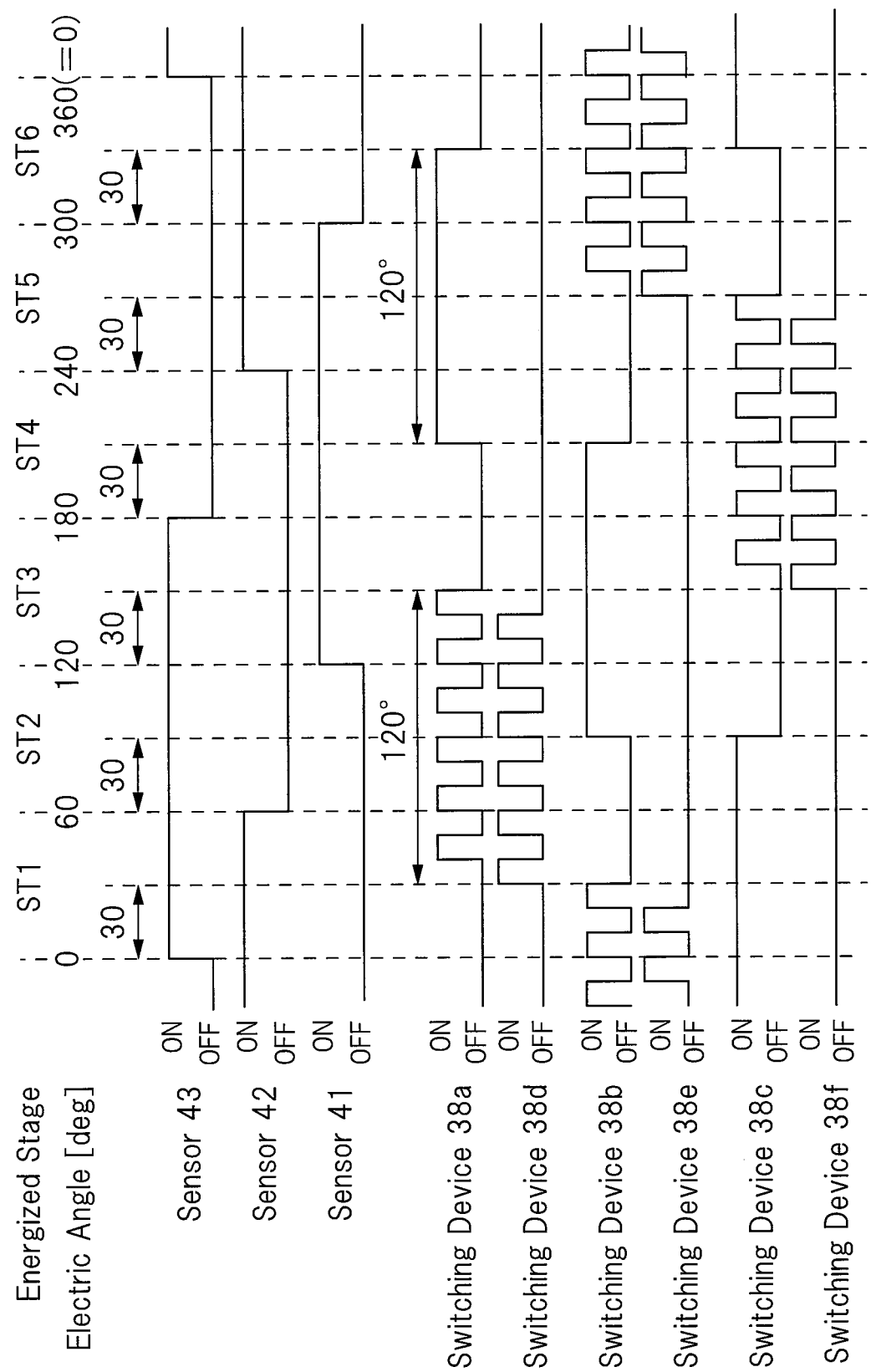
FIG. 18 is a time chart showing a drive pattern of first energization control executed by the motor apparatus of the present invention.

The drive patterns of FIGS. 17 and 18 are divided into six energization stages ST1 to ST6, which are started from rising edges or falling edges of the switching signals output from the sensors 41, 42, and 43, and, in this case, the energization stages are divided by the electric angles (degrees) determined in advance. In the examples of FIGS. 17 and 18, the energization stages are divided by the ranges (sections) of the electric angle 60°. The rising of the switching signal means switching of the switching signal from "off" to "on", and the falling of the switching signal means switching of the switching signal from "on" to "off".

In FIGS. 17 and 18, the on-section of each of the switching signals of the sensors 41, 42, and 43 is set to an electric angle 180°, and the on-sections of the switching signals of the sensors 41, 42, and 43 are set so as to be mutually shifted by the electric angle 60°.

FIG. 17 shows the drive patterns corresponding to the forward path of the wiper arm 15, wherein the switching signal of the sensor 43 corresponding to the U-phase is turned on at the timing of an electric angle 0° and is turned off at the timing of the electric angle 180°. While the switching signal of the sensor 43 corresponding to the U-phase is turned on, the switching signal of the sensor 41 corresponding to the W-phase is turned on at the timing of the electric angle 60°. The switching signal of the sensor 43 corresponding to the U-phase is turned off at the timing of an electric angle 240°.

Furthermore, while the switching signal of the sensor 41 corresponding to the W-phase is turned on, the switching signal of the sensor 42 corresponding to the V-phase is turned on at the timing of the electric angle 120°. The switching signal of the sensor 42 corresponding to the V-phase is turned off at the timing of an electric angle 300°. The control circuit 50 controls the switching elements 38a to 38f in a below manner on the basis of the switching signals of the sensors 41, 42, and 43.

The positive-electrode-side switching element 38a of the U-phase is constantly turned on in the section of an electric angle 120° from the timing of an electric angle 30° to the timing of an electric angle 150° and is alternately switched to "on" and "off" in the section of an electric angle 120° from the timing of an electric angle 210° to the timing of an electric angle 330°. Meanwhile, the negative-electrode-side switching element 38d of the U-phase is alternately switched to "on" and "off" in the section of an electric angle 120° from the timing of the electric angle 210° to the timing of the electric angle 330°.

Furthermore, the positive-electrode-side switching element 38b of the V-phase is alternately switched to "on" and "off" in the section of an electric angle 120° from the timing of the electric angle 330° to the timing of an electric angle 90°. Furthermore, the positive-electrode-side switching element 38b of the V-phase is turned on at the timing of the electric angle 150° and is constantly turned on until it is turned off at the timing of an electric angle 270°. On the other hand, the negative-electrode-side switching element 38e of the V-phase is alternately switched to "on" and "off" in the section of an electric angle 120° from the timing of the electric angle 330° to the timing of the electric angle 90°.

Furthermore, the positive-electrode-side switching element 38c of the W-phase is constantly turned on in the section of an electric angle 120° from the timing of the electric angle 270° to the timing of the electric angle 30°, and positive-electrode-side switching element 38c of the W-phase is alternately switched to "on" and "off" in the section of an electric angle 120° from the timing of the electric angle 90° to the timing of the electric angle 210°. Furthermore, the negative-electrode-side switching element 38c of the W-phase is alternately switched to "on" and "off" in the section of an electric angle 120° from the timing of the electric angle 90° to the timing of the electric angle 210°.

On the other hand, FIG. 18 shows the drive patterns corresponding to the return path, wherein the switching signal of the sensor 43 corresponding to the U-phase is turned on at the timing of the electric angle 0° and is turned off at the timing of the electric angle 180°. While the switching signal of the sensor 43 corresponding to the U-phase is turned on, the switching signal of the sensor 42 corresponding to the V-phase is turned on at the timing of the electric angle 60°. The switching signal of the sensor 42 corresponding to the V-phase is turned off at the timing of the electric angle 240°.

Furthermore, while the switching signal of the sensor 42 corresponding to the V-phase is turned on, the switching signal of the sensor 41 corresponding to the W-phase is turned on at the timing of the electric angle 120°. The switching signal of the sensor 41 corresponding to the W-phase is turned off at the timing of the electric angle 300°. The control circuit 50 controls the switching elements 38a to 38f in a below manner on the basis of the switching signals of the sensors 41, 42, and 43.

The positive-electrode-side switching element 38a of the U-phase is alternately switched to "on" and "off" in the section of an electric angle 120° from the timing of the electric angle 30° to the timing of the electric angle 150°. Meanwhile, in the section of an electric angle 120° from the timing of the electric angle 210° to the timing of the electric angle 330°, the switching element 38a is constantly turned on. On the other hand, the negative-electrode-side switching element 38d of the U-phase is alternately switched to "on" and "off" in the section of an electric angle 120° from the timing of the electric angle 30° to the timing of the electric angle 150°.

Furthermore, the positive-electrode-side switching element 38b of the V-phase is constantly turned on in the section of an electric angle 120° from the timing of the electric angle 90° to the timing of the electric angle 210°. Furthermore, the positive-electrode-side switching element 38b of the V-phase is alternately switched to "on" and "off" in the section of an electric angle 120° from the timing of an electric angle 270° to the timing of the electric angle 30°. On the other hand, the negative-electrode-side switching element 38e of the V-phase is alternately switched to "on" and "off" in the section of an electric angle 120° from the timing of the electric angle 270° to the timing of the electric angle 30°.

Furthermore, the positive-electrode-side switching element 38c of the W-phase is constantly turned on in the section of an electric angle 120° from the timing of the electric angle 330° to the timing of the electric angle 90°, the positive-electrode-side switching element 38c of the W-phase is alternately switched to "on" and "off" in the section of an electric angle 120° from the timing of the electric angle 150° to the timing of the electric angle 270°, and, the negative-electrode-side switching element 38f of the W-phase is alternately switched to "on" and "off" in the section of an electric angle 120° from the timing of the electric angle 150° to the timing of the electric angle 270°.

Figure 19:
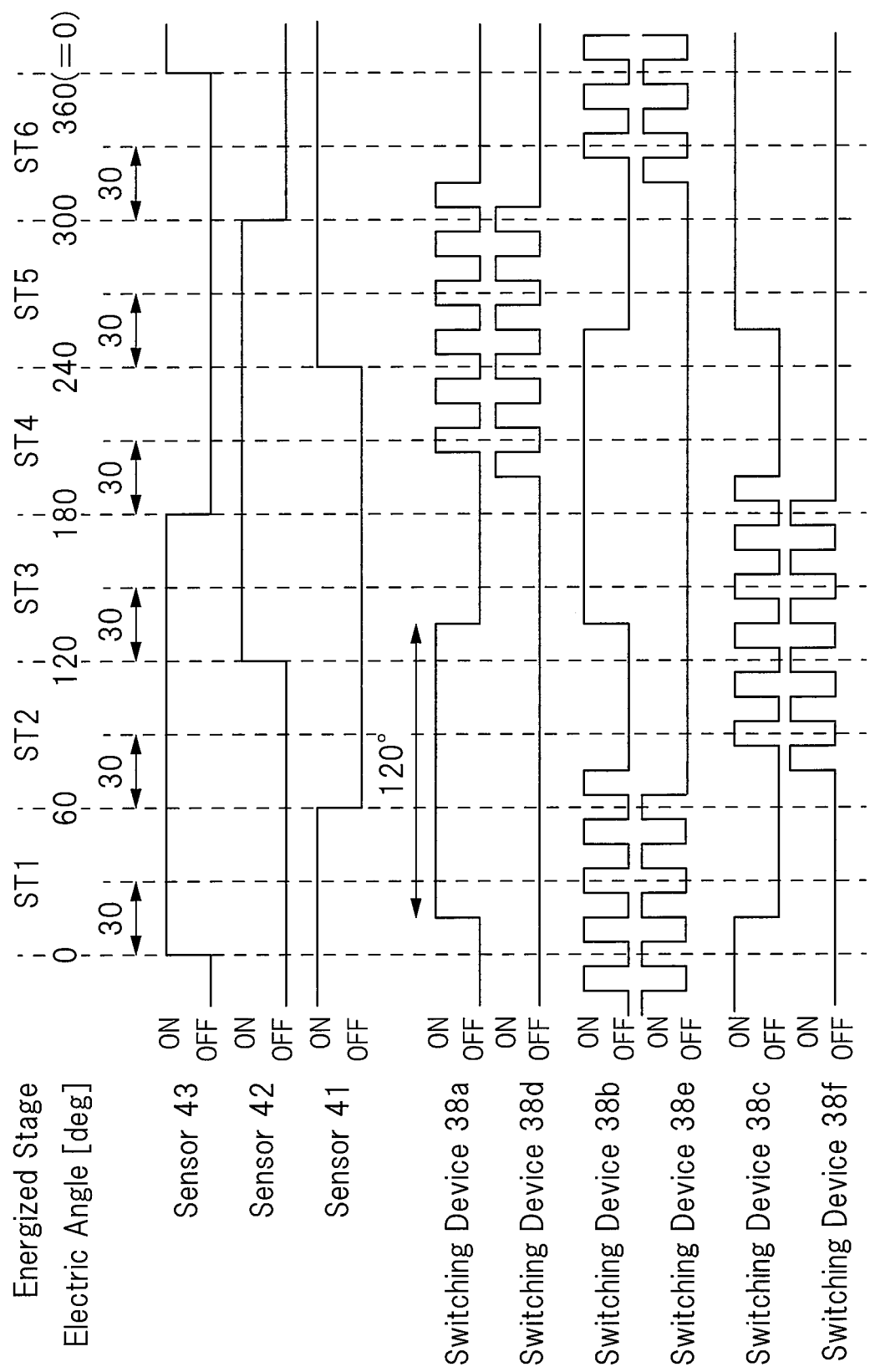
FIG. 19 is a time chart showing a drive pattern of second energization control executed by the motor apparatus of the present invention.

Then, the drive patterns of the switching elements 38a to 38f in the weak field control, which is the second energization control, will be described on the basis of FIG. 19. The weak field control is executed when the wiper arm 15 is moved in the forward path; and, when the wiper arm 15 is moved in the return path, the first energization control is executed. Also in FIG. 19, as well as FIG. 17, the energization stage ST1 to the energization stage ST6 and the electric angle 0° to the electric angle 360° are shown. In FIG. 19, the on/off timing of the switching signals of the sensors 41 to 43 are the same as the on/off timing of the switching signals of the sensors 41 to 43 in FIG. 17.

FIG. 19 shows the drive patterns of the switching elements 38a to 38f corresponding to the forward path of the wiper arm 15, and the control timing of the switching elements 38a to 38f shown in FIG. 19 is forward, in other words, by the amount corresponding to the section of an electric angle 30° compared with the control timing of the switching elements 38a to 38f shown in FIG. 7.

First, the positive-electrode-side switching element 38a of the U-phase is constantly turned on in the section of an electric angle 120° from the timing of an electric angle 15° to the timing of an electric angle 135° and is alternately switched to "on" and "off" in the section of an electric angle 120° from the timing of an electric angle 195° to the timing of an electric angle 315°. Meanwhile, the negative-electrode-side switching element 38d of the U-phase is alternately switched to "on" and "off" in the section of an electric angle 120° from the timing of the electric angle 195° to the timing of the electric angle 315°.

Furthermore, the positive-electrode-side switching element 38b of the V-phase is alternately switched to "on" and "off" in the section of an electric angle 120° from the timing of the electric angle 315° to the timing of the electric angle 75°, and the positive-electrode-side switching element 38b of the V-phase is constantly turned on while it is turned on at the timing of the electric angle 135° and turned off at the timing of an electric angle 255°. On the other hand, the negative-electrode-side switching element 38e of the V-phase is alternately switched to "on" and "off" in the section of an electric angle 120° from the timing of the electric angle 315° to the timing of the electric angle 75°.

Furthermore, the positive-electrode-side switching element 38c of the W-phase is constantly turned on in the section of an electric angle 120° from the timing of the electric angle 255° to the timing of the electric angle 15°, the positive-electrode-side switching element 38c of the W-phase is alternately switched to "on" and "off" in the section of an electric angle 120° from the timing of the electric angle 75° to the timing of the electric angle 195°, and the negative-electrode-side switching element 38f of the W-phase is alternately switched to "on" and "off" in the section of an electric angle 120° from the timing of the electric angle 75° to the timing of the electric angle 195°.

The above "weak field control" is a control for weakening the magnetic field generated by the armature 21 in comparison with that of the first energization control. When this weak field control is carried out, the back electromotive force generated at the armature coils U1, U2, V1, V2, W1, and W2 is reduced, and the rotation number of the rotor 27 is increased. FIG. 9 is a diagram showing characteristics of the brushless motor 18. In FIG. 9, the rotation number of the brushless motor 18 is shown by a vertical axis, and the torque of the brushless motor 18 is shown by a horizontal axis. Furthermore, FIG. 9 shows an example of the characteristics for the low-speed mode and an example of high-speed mode characteristics. It is possible to switch between the low-speed mode and an example of high-speed mode when the driver manipulates the wiper switch 44 and selects the low-speed mode or the high-speed mode.

In the brushless motor 18 of this embodiment, for example, a single characteristic is present at the position shown by a solid line so that the rotation number and torque corresponding to the low-speed mode characteristic of FIG. 9 can be obtained when the rating thereof is set. Therefore, if the low-speed mode is selected, the required rotation number and torque can be obtained in the range equal to and blow the single characteristic by executing the first energization control.

The single characteristic is the target output of the case in which the actual vehicle speed of the vehicle 10 is equal to or less than a reference vehicle speed, in other words, is the characteristic that satisfies the low-speed mode. An apparent characteristic is the target output of the case in which the actual vehicle speed of the vehicle 10 exceeds the reference vehicle speed, in other words, is the characteristic that satisfies the high-speed mode. The target output can be expressed by the rotation number and torque of the rotor 27. The conditions that determine the target output include various conditions such as the detection signals of the wiper switch 44, the detection signals of the vehicle-speed sensor 45, and the load of the wiper arm 15.

On the other hand, for example, when the high-speed mode is selected and the torque and rotation number required to the rotor 27 exceed the single characteristic, the rotation number and torque exceeding the single characteristic can be obtained by executing the weak field control or the second energization control by the control circuit 50. As a result, the characteristic of the brushless motor 18 is equivalent to the presence at the positions shown by a dashed-dotted line in FIG. 9 in terms of appearance.

Therefore, the brushless motor 18 can be subjected to determination of the rating thereof while using the low-speed mode as a reference in terms of design, and the size of the brushless motor 18 can be reduced as much as possible. The fact that the rotation number of the brushless motor 18 can be increased and the torque can be increased without changing the current value means that a torque constant is relatively increased. In other words, the brushless motor 18 of this embodiment can generate high torque as much as possible with smaller electric power consumption, and motor efficiency is improved.

Next, the drive patterns of the switching elements 38a to 39f in the third energization control will be described on the basis of FIG. 20. The third energization control is executed when the wiper arm 15 is moved in the forward path; and, when the wiper arm 15 is moved in the return path, the first energization control is executed. On the basis of the rotation direction of the rotor 27, the control circuit 50 detects in which one of the forward path and the return path the wiper arm 15 is moved.

Figure 20:
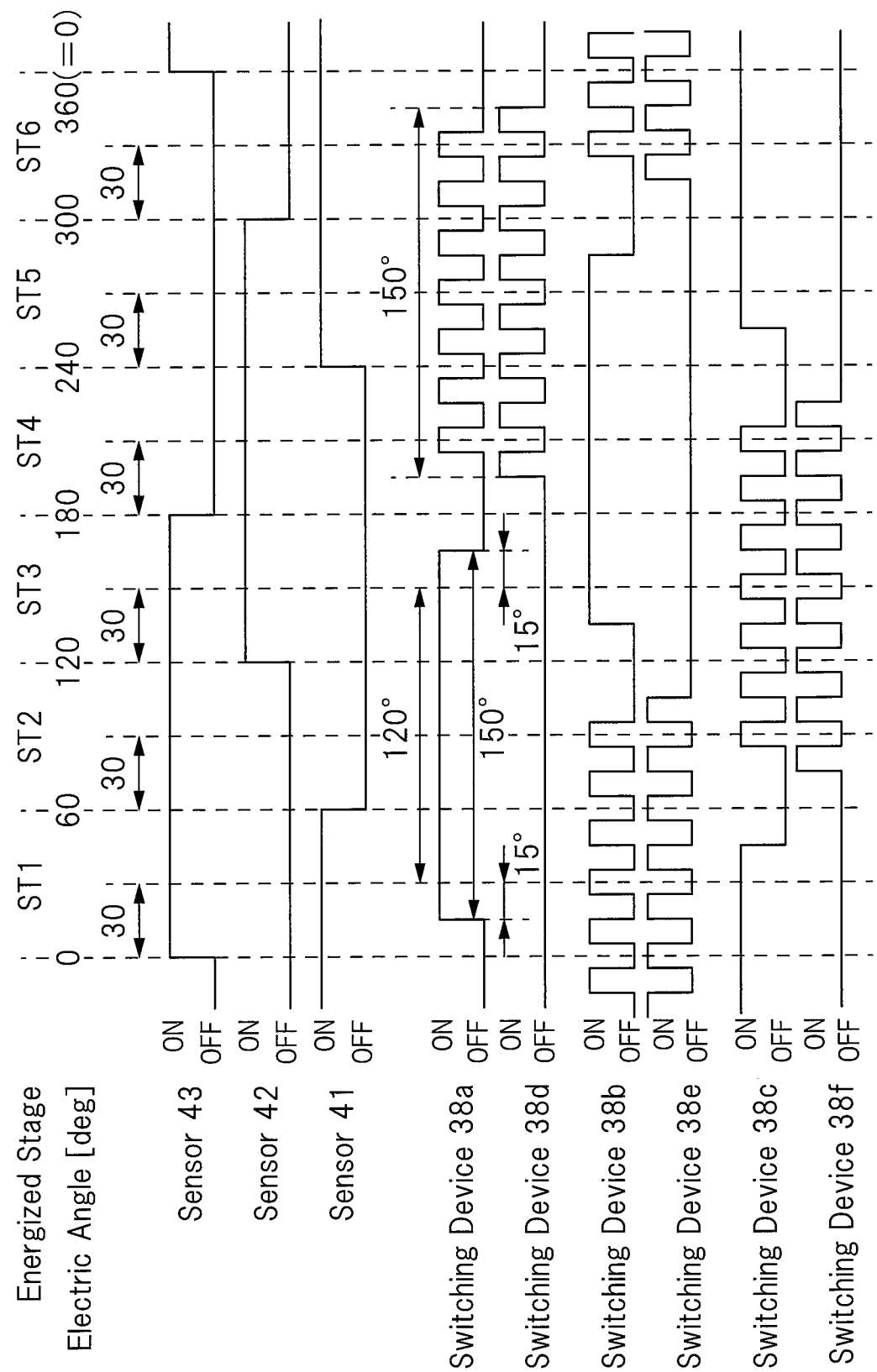
FIG. 20 is a time chart showing a drive pattern of third energization control executed by the motor apparatus of the present invention.

FIG. 20 also shows the energization stage ST1 to the energization stage ST6 and the electric angle 0° to the electric angle 360° as well as FIG. 17. In FIG. 20, the on/off timing of the switching signals of the sensors 41 to 43 is the same as the on/off timing of the switching signals of the sensors 41 to 43 in FIG. 17.

The control timing of the switching elements 38a to 38f shown in FIG. 20 is advanced by the amount corresponding to the section of an electric angle 15° compared with the control timing of the switching elements 38a to 38f shown in FIG. 17. This point is the same as the weak field control.

First, the positive-electrode-side switching element 38a of the U-phase is constantly turned on in the section of an electric angle 150° from the timing of the electric angle 15° to the timing of an electric angle 165° and is alternately switched to "on" and "off" in the section of an electric angle 150° from the timing of the electric angle 195° to the timing of an electric angle 345°. Meanwhile, the negative-electrode-side switching element 38d of the U-phase is alternately switched to "on" and "off" in the section of an electric angle 150° from the timing of the electric angle 195° to the timing of the electric angle 345°.

Meanwhile, the positive-electrode-side switching element 38b of the V-phase is alternately switched to "on" and "off" in the section of an electric angle 150° from the timing of the electric angle 315° to the timing of an electric angle 105°. Furthermore, the positive-electrode-side switching element 38b of the V-phase is turned on at the timing of the electric angle 135° and is constantly turned on in the section of an electric angle 150° until it is turned off at the timing of an electric angle 285°. On the other hand, the negative-electrode-side switching element 38e of the V-phase is alternately switched to "on" and "off" in the section of an electric angle 150° from the timing of the electric angle 315° to the timing of the electric angle 105°.

Furthermore, the positive-electrode-side switching element 38c of the W-phase is constantly turned on in the section of an electric angle 150° from the timing of the electric angle 255° to the timing of the electric angle 45°, the positive-electrode-side switching element 38c of the W-phase is alternately switched to "on" and "off" in the section of an electric angle 150° from the timing of the electric angle 75° to the timing of the electric angle 225°, and the negative-electrode-side switching element 38c of the W-phase is alternately switched to "on" and "off" in the section of an electric angle 150° from the timing of the electric angle 75° to the timing of the electric angle 225°.

In this manner, in the third energization control, the section of the electric angle 150° in which each of the switching elements 38a to 38f is turned on is longer by the amount corresponding to an electric angle 30° than the section of the electric angle 120° in which each of the switching elements 38a to 38f is turned on in the first energization control and the weak field control. In other words, it is longer by the amount corresponding to an electric angle 15° at each of the beginning and the end of the section of the electric angle 120°.

Next, regarding attachment of the sensors 41 to 43 to the control board 36, a case in which an error has occurred in the attachment positions thereof and causes the mutual distances between the sensors 41 to 43 to be different from targeted distances is simulated. In such a case, if the rotation position of the rotor 27 is estimated on the basis of the switching signals of the sensors 41 to 43, there is a difference between the actual rotation position of the rotor 27 and the estimated rotation position. Therefore, if the first energization control, the weak field control, or the third energization control is executed on the basis of the switching signals of the sensors 41 to 43, the timing to turn on/off the switching elements 38a to 38f and the energization periods thereof may become inappropriate.

Figure 21:
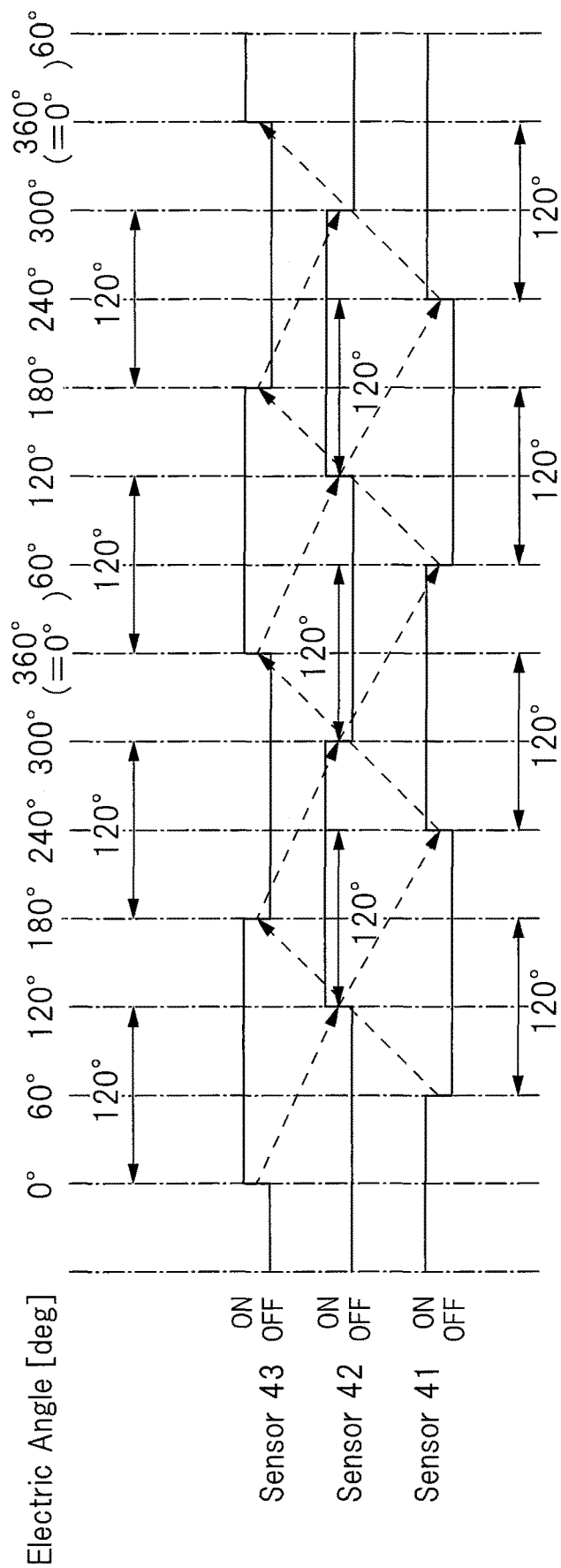
FIG. 21 is a time chart showing the waveforms of signals of sensors of the motor apparatus of the present invention.

In order to avoid such inconvenience, the drive apparatus 37 can carry out control as described below. First, an example of ideal waveforms of the switching signals of the sensors 41 to 43 is shown by a time chart of FIG. 21. The time chart of FIG. 21 shows electric angles by the sections each corresponding to 60° for the sake of convenience. The ideal waveforms of the switching signals of the sensors 41 to 43 switch edges from "on" to "off", and switch edges from "off" to "on" at every electric angle 60°.

In order to correct the phase shifting of the switching signals of the sensors 41 to 43, on the basis of the edge switching timing of a predetermined switching signal, the drive apparatus 37 estimates the edge switching timing which occurs thereafter.

For example, if the edge switching timing ahead by an electric angle 120° is calculated at every switching of edge timing, on the basis of the edge switching timing of the switching signal of the sensor 43 of the U-phase, the edge switching timing of the switching signal of the sensor 42 of the V-phase is estimated. Meanwhile, on the basis of the edge switching timing of the switching signal of the sensor 42 of the V-phase, the edge switching timing of the switching signal of the sensor 41 of the W-phase is estimated. Furthermore, on the basis of the edge switching timing of the switching signal of the sensor 41 of the W-phase, the edge switching timing of the switching signal of the sensor 43 of the U-phase is estimated.

Figure 22:
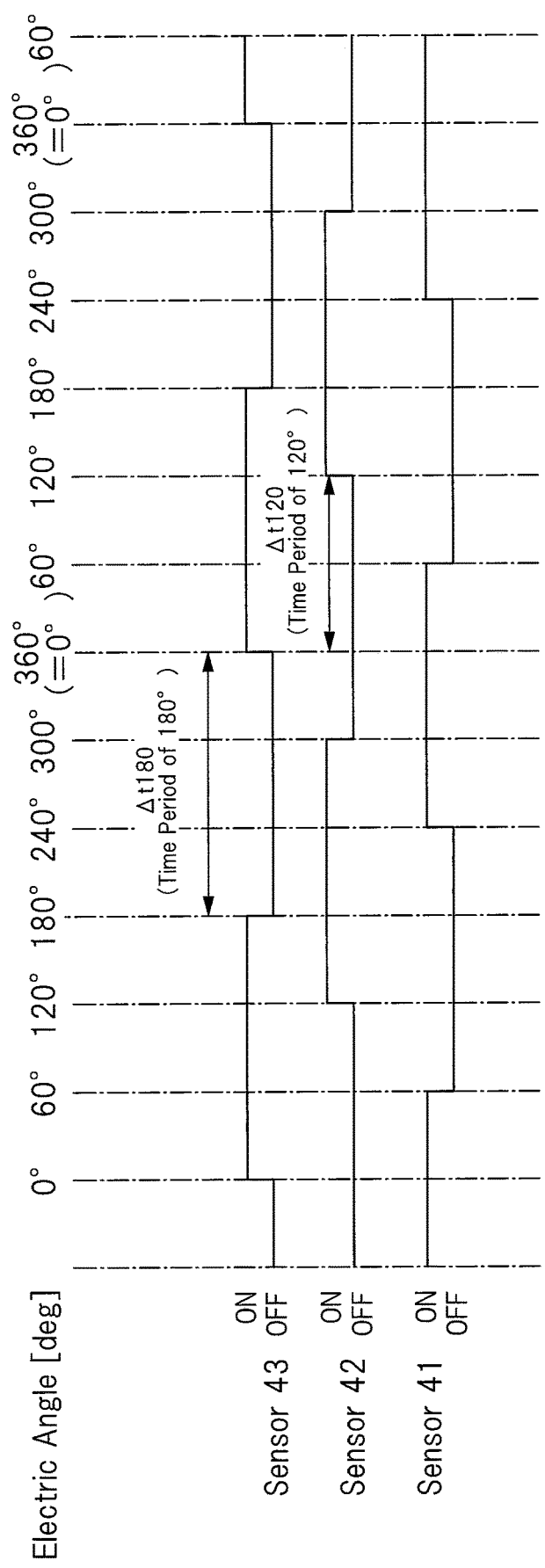
FIG. 22 is a time chart showing the waveforms of the signals of the sensors of the motor apparatus of the present invention.

Herein, in the time chart shown in FIG. 22, a method of calculating the ideal edge switching timing of the sensor 42 of the V-phase ahead by the electric angle 120° on the basis of the edge switching timing of the switching signal of the sensor 43 of the U-phase can be expressed by the following Equations (1) and (2).

The time corresponding to the electric angle 120°
$$(\Delta t120) = \Delta t180 \times 0.67 \quad \text{Equation (1)}$$

The timing ahead by the electric angle 120°
$$(p120) = \Delta t120 + FRT \quad \text{Equation (2)}$$

Here, "0.67" is a coefficient corresponding to the electric angle 120° with respect to the section of the electric angle 180°, in which on or off state of the switching signal is continued, "$\Delta t180$" is the time corresponding to the section of the electric angle 180°, and "FRT" is the time measured by a timer of the drive apparatus 37. That is, at every edge switching timing of the switching signal of the sensor 43, the ideal switching timing of the switching signal of the V-phase sensor 42 delayed by the electric angle 120° after the timing is estimated.

On the basis of the ideal switching timing, the drive apparatus 37 of this embodiment obtains, by an electric angle, the phase difference between the ideal switching timing and the switching timing of the actually detected switching signal and corrects the phase difference, thereby obtaining the ideal waveform of the switching signal. When the first energization control, the weak field control, or the third energization control is carried out, the drive apparatus 37 controls on/off of the switching elements 38a to 38f on the basis of the ideal waveforms of the switching signals.

Next, a specific correction example of the switching signal will be described. Herein, an example which uses the switching signal of the sensor 42 corresponding to the V-phase as a reference signal and corrects the switching signals of the other sensors 41 and 43 will be described. This is for a reason that, among the sensors 41 to 43, the sensor 42 is the closest to the sensor magnet 34 and is capable of detecting stable signals.

Correction Example 1

Figure 23:
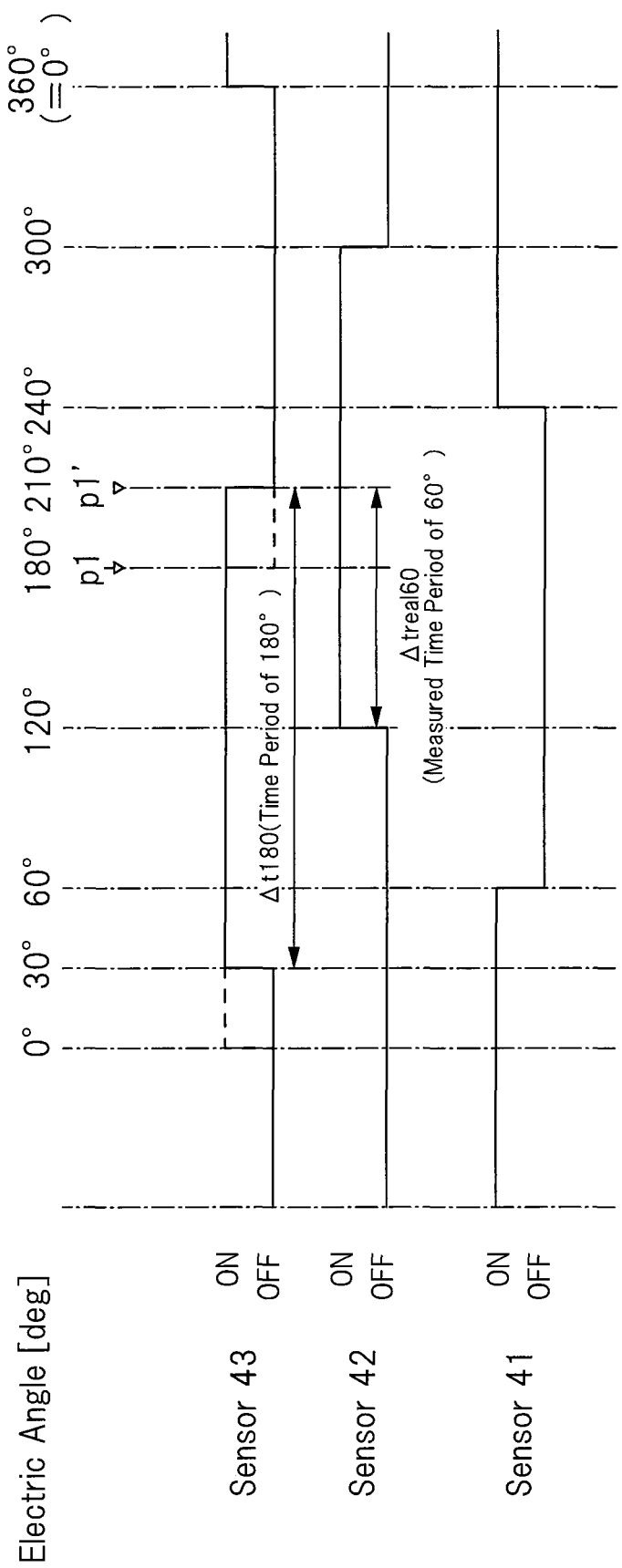
FIG. 23 is a time chart showing the waveforms of the signals of the sensors of the motor apparatus of the present invention.

First, with reference to the time chart of FIG. 23, an example which uses the sensor 42 of the V-phase as a reference and corrects the switching signal of the sensor 43 of the U-phase will be described. The switching signals of the sensors 41 to 43 shown in FIG. 23 are the same as the switching signals of the sensors 41 to 43 shown in FIG. 17. The time chart of FIG. 23 shows electric angles by the sections each corresponding to 60° for the sake of convenience.

As shown by broken lines, the ideal waveform of the switching signal of the sensor 43 is turned on at the electric angle 0°, continues to be on for the section of an electric angle 180°, and is then switched to off at the timing of the electric angle 180°. More specifically, the ideal waveform of the switching signal of the sensor 43 is turned off at the timing of the electric angle 180° (p1) delayed by a section of an electric angle 60° from the timing of the electric angle 120° at which the switching signal of the sensor 42 is turned on.

On the other hand, as shown by a solid line, a case in which the actual waveform of the switching signal of the sensor 43 is turned on at the timing of the electric angle 30°, then turned on for the section of an electric angle 180°, and then turned off at the timing of an electric angle 210° (p1') is simulated. More specifically, between the ideal electric angle 180° and the actual electric angle 210°, there is a phase difference (shifting) corresponding to the section of an electric angle 30°. This can be expressed by Equation (3).

$$\text{The phase difference} = p1' - p1 \quad \text{Equation (3)}$$

The drive apparatus 37 is constantly detecting time Δt180 corresponding to the section of the electric angle 180° in the switching signal of the sensor 43. Then, ideal time Δt60 corresponding to the section of the ideal electric angle 60° from the timing at which the sensor 42 is turned on to the timing at which the sensor 43 is turned off is calculated. Furthermore, the drive apparatus 37 calculates actual measurement time Δtreal60 corresponding to the section of the actual electric angle 90° from the timing at which the sensor 42 is turned on to the timing at which the sensor 43 is turned off. Furthermore, the drive apparatus 37 obtains an adjustment value (correction value) "AdjPhase" of the switching signal of the sensor 43 from the difference between the ideal time Δt60 and the actual measurement time Δtreal60. This process can be expressed by Equation (4) and Equation (5).

$$\Delta t60 = \Delta t180 \times 0.334 \quad \text{Equation (4)}$$

$$\text{AdjPhase} = \Delta t60 - \Delta treal60 \quad \text{Equation (5)}$$

Herein, "0.334" is a coefficient of the section of the electric angle 60° with respect to the section of the electric angle 180° in which on or off of the switching signal is continued.

Then, the drive apparatus 37 carries out a process of correcting the off-timing of the switching signal of the sensor 43 to the timing of the electric angle 180° (p1), which has been advanced by the section of the electric angle 30° from the electric angle 210°. In other words, the section of the electric angle from the timing at which the switching signal of the sensor 42 is turned on to the timing at which the switching signal of the sensor 43 is turned off can be changed to the ideal electric angle 60°.

Correction Example 2

Figure 24:
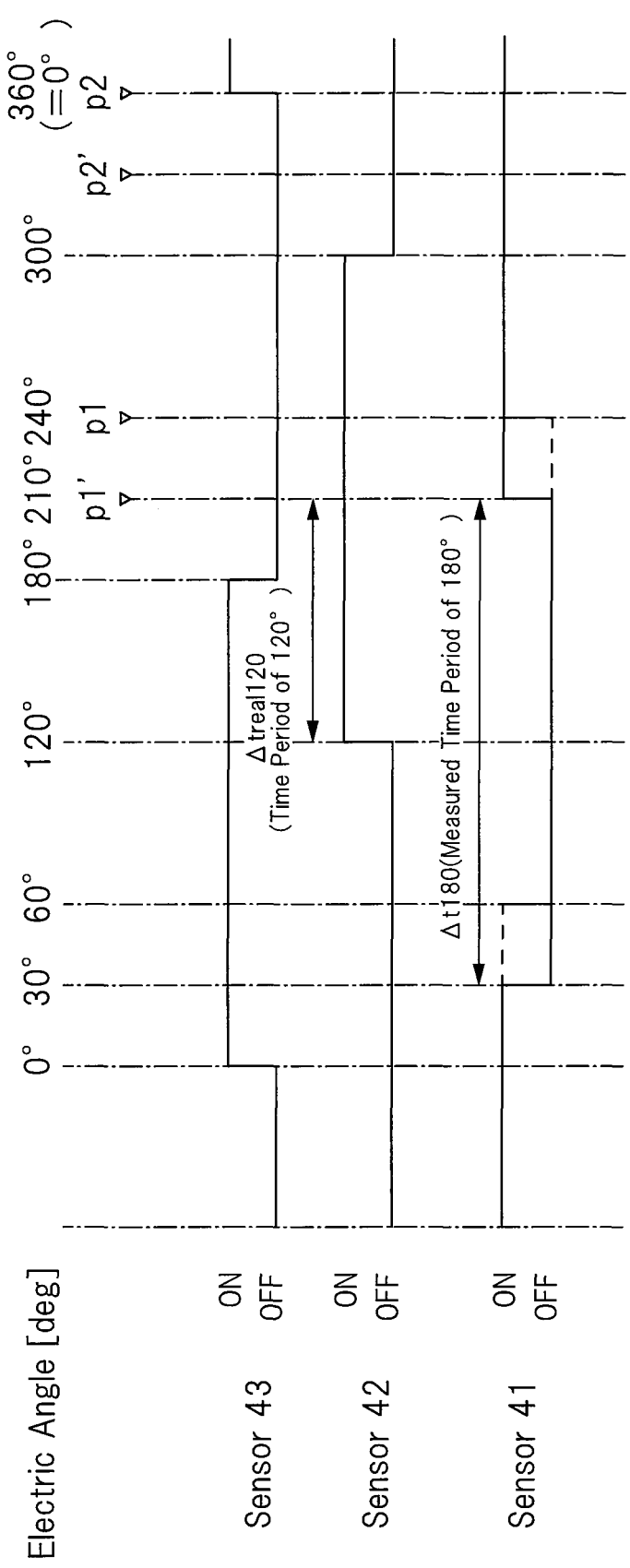
FIG. 24 is a time chart showing the waveforms of the signals of the sensors of the motor apparatus of the present invention.

Next, by reference to the time chart of FIG. 24, an example which uses the sensor 42 of the V-phase as a reference and corrects the switching signal of the sensor 41 of the W-phase will be described. The switching signals of the sensors 41 to 43 shown in FIG. 24 are the same as the switching signals of the sensors 41 to 43 shown in FIG. 17. The timing chart of FIG. 24 shows electric angles by the sections each corresponding to 60° for the sake of convenience. As shown by broken lines, the ideal waveform of the switching signal of the sensor 41 is turned off at the electric angle 60°, maintains to be off for the section of an electric angle 180°, and is then switched to on at the electric angle 240°. In other words, the ideal waveform of the switching signal of the sensor 41 is turned on at the timing of the electric angle 240° (p1) which is delayed by the section of an electric angle 120° from the timing of the electric angle 120° at which the switching signal of the sensor 42 is turned on.

On the other hand, as shown by a solid line, a case in which the actual waveform of the switching signal of the sensor 41 is turned off at the timing of the electric angle 30°, is turned off for the section of an electric angle 180°, and is then turned on at the timing of the electric angle 210° (p1') is simulated. More specifically, between the ideal electric angle 240° and the actual electric angle 210°, there is a phase difference (shifting) corresponding to the section of an electric angle 30°. This phase difference is expressed by Equation (6).

$$\text{The phase difference} = p1 - p1' \quad \text{Equation (6)}$$

The drive apparatus 37 is constantly detecting the time Δt180 corresponding to the section of the electric angle 180° in the switching signal of the sensor 41. Then, ideal time Δt120 corresponding to the section of an ideal electric angle 120° from the timing at which the sensor 42 is turned on to the timing at which the sensor 41 is turned on is calculated. Furthermore, the control circuit 50 calculates actual measurement time Δtreal120 corresponding to the section of an actual electric angle 90° from the timing at which the sensor 42 is turned on to the timing at which the sensor 41 is turned off. Furthermore, the control circuit 50 obtains an adjustment value (correction value) "AdjPhase" of the switching signal of the sensor 41 from the difference between the ideal time Δt120 and the actual measurement time Δtreal120. This process is expressed by Equation (7).

$$\text{AdjPhase} = \Delta t120 - \Delta treal120 \quad \text{Equation (7)}$$

Then, the control circuit 50 turns on the switching signal of the sensor 43 at the timing of the electric angle 360° (p2) having an interval of a section of an electric angle 120° from the electric angle 240°, which is the on-timing of the corrected switching signal of the sensor 41. The section of the electric angle from the timing at which the switching signal of the sensor 41 is turned on to the timing at which the switching signal of the sensor 43 is turned on can be changed to the ideal electric angle 120°. This process is expressed by Equation (8).

$$p2 = p120 + \text{AdjPhase} \quad \text{Equation (8)}$$

This Equation (8) means that it is possible to obtain, by using the adjustment value (correction value) "AdjPhase", the timing P2 of the electric angle of the switching signal which is turned on at the timing having an interval of an electric angle 120° (p120) from the timing of the electric angle 240°.

Note that, if the correction that turns on the switching signal of the sensor 43 at the timing of the electric angle 330° (p2') having an interval of the section of an electric angle 120° from the electric angle 210°, which is the before-adjustment off-timing of the switching signal of the sensor 41 is carried out, a phase difference corresponding to the section of an electric angle 30° from the ideal electric angle 360° is generated.

Figure 25:
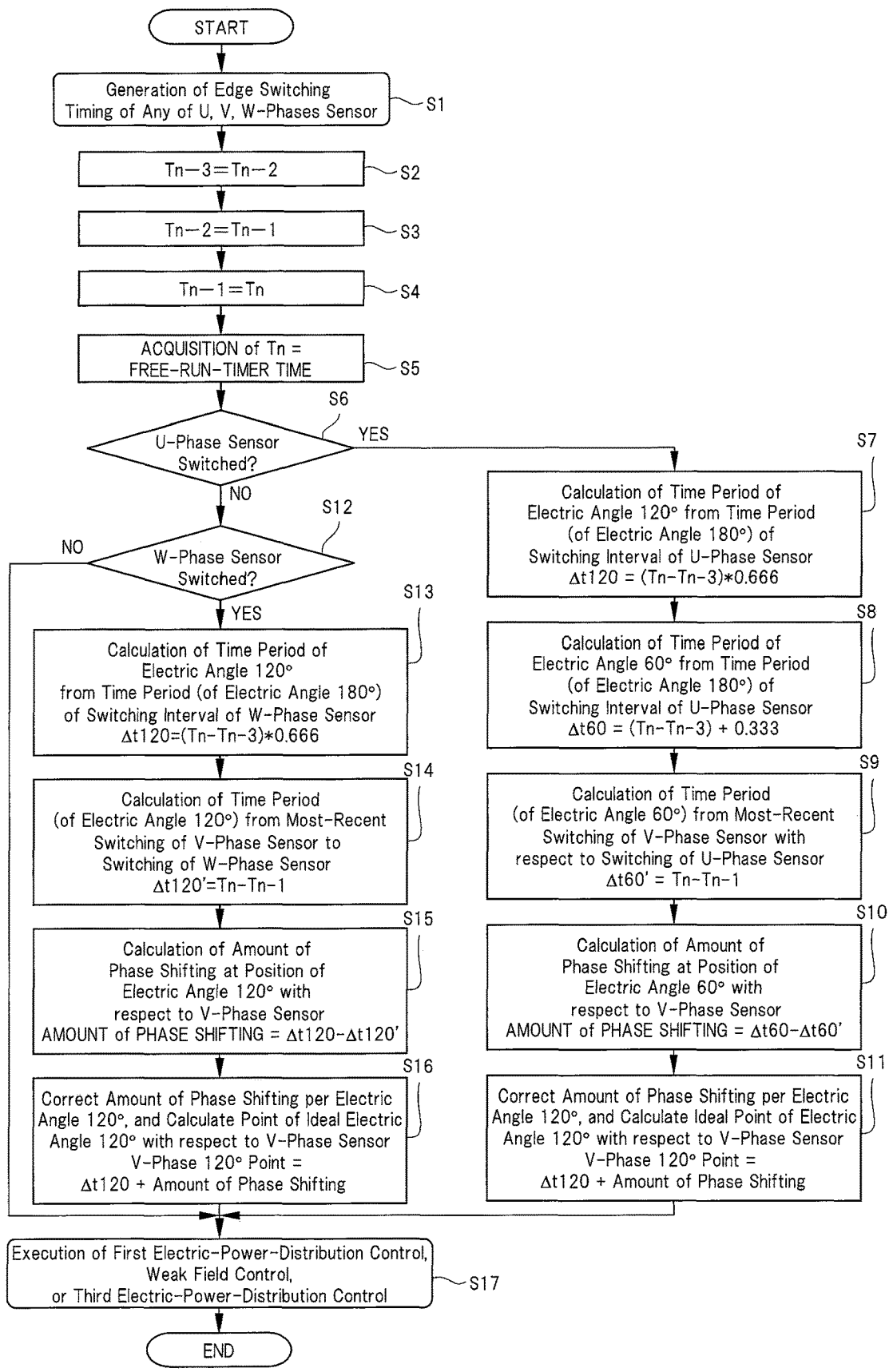
FIG. 25 is a flow chart showing a control example, which can be executed by the motor apparatus of the present invention.

Next, the above control method will be comprehensively described by the flow chart of FIG. 25. If the drive apparatus 37 detects the edge switching timing of any of the sensor among the sensor 43 of the U-phase, the sensor 42 of the V-phase, and the sensor of the W-phase (step S1), the drive apparatus 37 executes the processes of step S2 to step S5.

The process of step S2 is expressed by Tn−3=Tn−2,
the process of step 3 is expressed by Tn−2=Tn−1, and
the process of step S4 is expressed by Tn−1=Tn.

"Tn" is the latest measurement time corresponding to the section of the electric angle 60°, "Tn−1" is the measurement time corresponding to the electric angle 60° which is one time before the latest measurement time, "Tn−2" is the measurement time corresponding to the electric angle 60° two times before the latest measurement time, and "Tn−3" is the measurement time corresponding to the electric angle 60° three times before the latest measurement time. In other words, step S2 to step S4 mean to update the measurement time of the one-time-before to three-time-before electric angles 60°. The drive apparatus 37 acquires the latest measurement time corresponding to the section of the electric angle 60° in step S5.

In step S6 subsequent to step S5, the drive apparatus 37 judges whether it is the timing at which the edge of the switching signal of the sensor 43 of the U-phase is switched or not. If the drive apparatus 37 judges YES in step S6, the drive apparatus 37 proceeds to step S7. For example, the example in which YES is judged in step S6 is at the timing of the electric angle 360° of FIG. 22. Then, in step S7, the drive apparatus 37 obtains the time Δt120 corresponding to the section of the electric angle 120° from the time Δt180 corresponding to the section of the electric angle 180° of the switching signal of the sensor 43.

Subsequent to step S7, the drive apparatus 37 executes the processes of step S8 to step S11, executes the process of step S17, and terminates a control routine. The processes of step S8 to step S11 are the processes described by referencing the time chart of FIG. 23. First, the process of step S8 is the process of obtaining the ideal time Δt60 corresponding to the section of the ideal electric angle 60° from the time Δt180 corresponding to the section of the electric angle 180° of the switching signal of the sensor 43 of the U-phase.

The process of step S9 is the process of obtaining the actual measurement time Δtreal60 corresponding to the actual section of the electric angle 60° from the timing at which the sensor 42 is turned on to the timing at which the sensor 43 is turned off.

The process of step S10 is the process of obtaining the phase difference (shifting) between the ideal section of the electric angle 60° and the actual section of the electric angle 60°. This process is expressed by the phase difference=Δt60−Δ60'.

Herein, Δt60' has the same meaning as Δtreal60 in Equation (5)

Meanwhile, in step S11, the process of correcting the off-timing of the switching signal of the sensor 43 to the timing of the electric angle 180° (p1), which has been advanced by the section of the electric angle 30° from the electric angle 210°.

The process of step S17 selects and executes any of the first energization control, the weak field control, and the third energization control by using the switching signal, which serves as a reference, and the corrected switching signal.

On the other hand, if the drive apparatus 37 judges NO in step S6, the drive apparatus 37 judges in step S12 whether it is the timing at which the switching signal of the sensor 41 is switched or not. If the drive apparatus 37 judges YES in step S12, the drive apparatus 37 executes the processes of step S13 to step S16 and, after step S17, terminates the control routine.

The processes from step S13 to step S16 are the processes described by referencing the time chart of FIG. 24. First, the process of step S13 is the process of obtaining the ideal time Δt120 corresponding to the ideal section of the electric angle 120° from the time Δt180 corresponding to the section of the electric angle 180° of the switching signal of the sensor 41 of the W-phase.

The process of step S14 is a process of obtaining the time Δt120' corresponding to the ideal section of the electric angle 120° from the timing at which the sensor 42 has been most recently turned on to the point at which the sensor 43 is turned on as Δt120'=Tn−Tn−1.

The process of step S15 is the process of obtaining the phase difference (shifting) between the ideal section of the electric angle 120° and the actual section of the electric angle 90°. This process is expressed by the following equation.

The phase difference=Δt120−Δt120'.

Meanwhile, in step S16, the process of correcting the timing of the switching signal of the sensor 41 to the timing of the electric angle 240° (p1), which is delayed by the section of the electric angle 30° from the electric angle 210°, is carried out.

As described above, the motor apparatus 17 can correct the switching signal of the sensors 41 or 43 on the basis of the switching signal of the sensor 42. Therefore, even if there is an error in the mutual distances between the sensors 41, 42, and 43 with respect to ideal distances, the first energization control, the weak field control, or the third energization control can be appropriately carried out by using the corrected switching signal. Therefore, in accordance with the conditions such as the movement position, movement direction, load, mode, etc. of the wiper arm 15, the rotation number, the torque, etc. of the rotor 27 of the brushless motor 18 can be obtained. Therefore, efficiency of the motor apparatus 17 can be improved, noise can be suppressed, and vibrations can be avoided.

Furthermore, since the switching signals of the sensors 41, 42, and 43 can be corrected, the sensors 41, 42, and 43 can be disposed on the same plane of the control board 36. Therefore, dedicated sensor supporting members for attaching the three sensors are not required to be provided around the rotor. Therefore, lead wires, etc. for connecting the three sensors provided at the dedicated sensor supporting members and the control circuit are not required to be provided. Therefore, the size and cost of the motor apparatus 17 can be reduced.

The drive apparatus 37 described in the above described second embodiment corresponds to a signal correcting unit and an element control unit of the present invention. In the first energization control, the timing of the electric angle 30° at which the switching element 38*a* is turned on corresponds to first timing of the present invention, and the timing of the electric angle 15° at which the switching element 38*a* is turned on in the weak field control or the third energization control corresponds to second timing of the present invention. The speed reduction mechanism 19 and the pivot shaft 14 correspond to a power transmitting mechanism of the present invention. Furthermore, step S7 to step S11 and step S13 to step S16 correspond to a first step of the present invention, and step S17 corresponds to a second step of the present invention.

The drive apparatus of the present invention is not limited to that of the second embodiment, and it goes without saying that various modifications can be made within the range not deviating from the gist thereof. For example, it is possible to correct the switching signal from other sensor by using the switching signal of the sensor of the U-phase, and it is possible to correct the switching signal from other sensor by using the switching signal of the sensor of the W-phase. Furthermore, the brushless motor of the present invention includes the structure of a star connection in which armature coils are connected in Y shapes. The brushless motor of the present invention includes one in which the rotor has an IPM (Interior Permanent Magnet) structure. In the IPM structure, permanent magnets are buried in the rotor core. Meanwhile, the first period is not limited to the electric angle 120°, but may be less than the electric angle 120°, or may exceed the electric angle 120°.

The brushless motor of the present invention includes the inner-rotor-type structure in which the rotor is disposed in the inner side of the stator and an outer-rotor-type structure in which the rotor is disposed in the outer side of the stator.

The wiper apparatus of the present invention includes a wiper apparatus in which the wiper blade wipes off a rear glass. Thus, the wind glass of the wiper apparatus of the present invention includes a windshield and a rear glass. Furthermore, the wiper apparatus of the present invention includes a configuration in which two wiper arms are singularly driven by a single brushless motor.

The brushless motor of the second embodiment includes, other than the wiper motor that operates the wiper apparatus, brushless motors provided for operating action members such as a door, a roof, a glass, etc. in, for example, a power slide door apparatus, a sunroof apparatus, or a power window apparatus provided in a vehicle. Note that the drive apparatus 37 corresponds to a control unit and a mode switching unit of the present invention.

The brushless motor, motor apparatus, and control method according to the present invention can be utilized in wiper apparatuses, power-slide-door apparatuses, sunroof apparatuses, and power window apparatuses provided in vehicles.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wiper apparatus, comprising:
   a wiper blade which wipes off foreign objects on a front windshield of a vehicle;
   a wiper arm to which a wiper blade is attached; and
   a motor apparatus configured to drive the wiper arm, wherein the motor apparatus comprises:
      a brushless motor which drives the wiper arm;
      a driving apparatus which controls the brushless motor;
      a control board provided with the driving apparatus; and
      a gear case in which the driving apparatus and the control board are accommodated,
   the brushless motor has:
      a stator having coils to which an electric current is supplied; and
      a rotor formed with a worm, the rotor being rotated by a rotating magnetic field formed by the stator,
   the gear case is provided with:
      a worm wheel meshed with the worm; and
      a pivot shaft which is integrally rotated with the worm wheel,
   the driving apparatus has a control unit which switches and selectively executes:
      first energization control to start energization to the coils at a first timing, and to continue the energization for a first period to control the rotation number of the rotor; and
      second energization control to start energization to the coils at a second timing advanced by an electric angle with respect to the first timing, and to continue the energization for a second period longer than the first period to control the rotation number of the rotor,
   the second timing is advanced with respect to the first timing by an electric angle equal to or more than 30 degrees, and equal to or less than 60 degrees,
   the first period is set to an electric angle of 120 degrees,
   the second period is set, on the basis of the electric angle by which the second timing is advanced with respect to the first timing, within a range equal to or more than an electric angle of 135 degrees, and equal to or less than an electric angle of 165 degrees,
   a torque ripple rate in a case in which the second energization control is executed is reduced more than a torque ripple rate in a case in which the first energization control is executed,
   the control unit includes:
      a mode switching unit which switches and selects one of a low-speed mode to move the wiper arm at a speed determined in advance, and a high-speed mode to move the wiper arm at a speed faster than the low-speed mode; and
      a plurality of sensors for detecting rotation phases of the rotor, and
   in accordance with conditions of the low-speed or high-speed mode selected by the mode switching unit and of an actuation load of the wiper arm estimated from output signals of the sensors, the control unit executes the first energization control in which a current waveform becomes a rectangular wave or the second energization control in which a change in a current waveform becomes smoother than that in the rectangular wave, radiated sound generated around the brushless motor being made low.

2. The wiper apparatus according to claim 1, wherein the rotor has:
   a rotor shaft having a rotor core attached to an outer peripheral surface thereof; and
   four permanent magnets disposed on the outer peripheral surface of the rotor core along a circumferential direction of the rotor shaft,
   the stator is disposed outside the rotor, the stator has six teeth disposed at intervals in the circumferential direction of the rotor shaft, the coils wound around the teeth being arranged by delta connection and six slots.

3. The wiper apparatus according to claim 1, further comprising:
   a plurality of switching elements which separately turn on or off current supply paths connected to the coils;
   a plurality of sensors which are different in phase from each other, provided in a rotation direction of the rotor, and detects a phase of the rotor in the rotation direction to generate output signals;
   a signal correcting unit which uses an output signal of any one sensor among the sensors as a reference signal, and corrects the output signal of the other sensor; and
   an element control unit which separately turns on or off the switching elements on the basis of the reference signal and the corrected output signal.

4. The wiper apparatus according to claim 3, wherein
   the element control unit executes a third energization control to continue energization to the coils for a period longer than a period for which the energization to the coils is continued in the second energization control.

5. The wiper apparatus according to claim 3, wherein
   the switching elements, the sensors, the signal correcting unit, and the element control unit are mounted on the control board.

6. A control method for the wiper apparatus according to claim 3, the motor apparatus controlling an output of a rotor, the control method comprising:
   a first step of controlling the output of the rotor by using an output signal of any one sensor among the sensors as a reference signal, and correcting the output signal of the other sensor; and
   a second step of separately turning on or off the switching elements on the basis of the reference signal and the corrected output signal.

* * * * *